US012631856B2

(12) United States Patent
Shim

(10) Patent No.: US 12,631,856 B2
(45) Date of Patent: May 19, 2026

(54) OPTICAL SYSTEM AND CAMERA MODULE COMPRISING SAME

(71) Applicant: LG INNOTEK CO., LTD., Seoul (KR)

(72) Inventor: Ju Yong Shim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 322 days.

(21) Appl. No.: 18/575,737

(22) PCT Filed: Jul. 1, 2022

(86) PCT No.: PCT/KR2022/009527
§ 371 (c)(1),
(2) Date: Dec. 29, 2023

(87) PCT Pub. No.: WO2023/277651
PCT Pub. Date: Jan. 5, 2023

(65) Prior Publication Data
US 2024/0353653 A1      Oct. 24, 2024

(30) Foreign Application Priority Data

Jul. 1, 2021      (KR) ........................ 10-2021-0086365

(51) Int. Cl.
*G02B 15/14* (2006.01)
*G02B 3/00* (2006.01)
(Continued)

(52) U.S. Cl.
CPC ....... *G02B 13/0045* (2013.01); *G02B 3/0087* (2013.01); *G02B 13/009* (2013.01);
(Continued)

(58) Field of Classification Search
CPC .... G02B 15/144103; G02B 15/144105; G02B 15/144107; G02B 15/144511; G02B 15/144513
See application file for complete search history.

(56) References Cited

U.S. PATENT DOCUMENTS 5,347,399 A      9/1994  Yoneyama et al.
7,561,343 B2     7/2009  Hankawa et al.
(Continued)

FOREIGN PATENT DOCUMENTS

JP       5-303034 A      11/1993
JP       2005-78038 A     3/2005
(Continued)

OTHER PUBLICATIONS

International Search Report dated Oct. 14, 2022 in International Application No. PCT/KR2022/009527.
(Continued)

*Primary Examiner* — Joseph P Martinez
(74) *Attorney, Agent, or Firm* — Saliwanchik, Lloyd & Eisenschenk

(57) ABSTRACT

The optical system disclosed in the embodiment of the invention includes first to fourth lens groups arranged along an optical axis from an object side toward a sensor side and including each including at least one lens, wherein the first lens group has a refractive power opposite to that of the fourth lens group, the second lens group has a refractive power opposite to that of the third lens group, the first and fourth lens groups are fixed, the second and third lens groups are moved in a direction of the optical axis, each of the first and fourth lens groups includes at least one lens of a non-circular shape, the non-circular lens has a non-circular ratio (CH/CA) greater than 0.7, the non-circular ratio is a ratio of a minimum clear aperture (CH: clear height) and maximum clear aperture (CA) of a lens surface with a large clear aperture among an object-side surface and a sensor-side surface of the non-circular lens, and the non-circular ratio of at least one lens included in the first lens group may be greater than the non-circular ratio of at least one lens included in the fourth lens group.

20 Claims, 11 Drawing Sheets

(51) Int. Cl.
| | |
|---|---|
| *G02B 13/00* | (2006.01) |
| *G02B 15/24* | (2006.01) |
| *G03B 30/00* | (2021.01) |

(52) U.S. Cl.
CPC ............. *G02B 15/24* (2013.01); *G03B 30/00* (2021.01); *G02B 2003/0093* (2013.01)

(56) References Cited

U.S. PATENT DOCUMENTS

| | | | |
|---|---|---|---|
| 8,373,774 | B2 | 2/2013 | Hosaya et al. |
| 9,465,199 | B2 | 10/2016 | Nomura et al. |
| 12,313,827 | B2 | 5/2025 | Shim |
| 2006/0280498 | A1* | 12/2006 | Souma ........... G02B 15/144511 |
| | | | 396/351 |
| 2008/0084615 | A1 | 4/2008 | Hankawa et al. |
| 2009/0180183 | A1 | 7/2009 | Heu |
| 2011/0157430 | A1 | 6/2011 | Hosoya et al. |
| 2012/0008214 | A1 | 1/2012 | Toyoda et al. |
| 2013/0001643 | A1 | 1/2013 | Yagi et al. |
| 2015/0103417 | A1 | 4/2015 | Nomura et al. |
| 2021/0063704 | A1 | 3/2021 | Son et al. |
| 2022/0121001 | A1 | 4/2022 | Xu |
| 2022/0404597 | A1 | 12/2022 | Shim |

FOREIGN PATENT DOCUMENTS

| | | | |
|---|---|---|---|
| JP | 2006-343554 | A | 12/2006 |
| JP | 2008-96559 | A | 4/2008 |
| JP | 2011-81371 | A | 4/2011 |
| JP | 2011-138047 | A | 7/2011 |
| JP | 2012-18277 | A | 1/2012 |
| JP | 5621782 | B2 | 11/2014 |
| JP | 2014-238469 | A | 12/2014 |
| JP | 2015-79047 | A | 4/2015 |
| KR | 10-2009-0077517 | A | 7/2009 |
| KR | 10-2021-0027187 | A | 3/2021 |
| WO | 2021/052345 | A1 | 3/2021 |
| WO | 2021/101158 | A1 | 5/2021 |

OTHER PUBLICATIONS

Office Action dated May 13, 2025 in Japanese Application No. 2023-580844.
Office Action dated Jan. 7, 2025 in Japanese Application No. 2023-580844.

* cited by examiner

FIG. 11

OPTICAL SYSTEM AND CAMERA MODULE COMPRISING SAME

CROSS-REFERENCE TO RELATED APPLICATIONS

This application is the U.S. national stage application of International Patent Application No. PCT/KR2022/009527, filed Jul. 1, 2022, which claims the benefit under 35 U.S.C. § 119 of Korean Application No. 10-2021-0086365, filed Jul. 1, 2021, the disclosures of each of which are incorporated herein by reference in their entirety.

TECHNICAL FIELD

An embodiment relates to an optical system for improved optical performance and a camera module including the same.

BACKGROUND ART

The camera module captures an object and stores it as an image or video, and is installed in various applications. In particular, the camera module is produced in a very small size and is applied to not only portable devices such as smartphones, tablet PCs, and laptops, but also drones and vehicles to provide various functions. For example, the optical system of the camera module may include an imaging lens for forming an image, and an image sensor for converting the formed image into an electrical signal. In this case, the camera module may perform an autofocus (AF) function of aligning the focal lengths of the lenses by automatically adjusting the distance between the image sensor and the imaging lens, and may perform a zooning function of zooming up or zooning out by increasing or decreasing the magnification of a remote object through a zoom lens. In addition, the camera module employs an image stabilization (IS) technology to correct or inhibit image stabilization due to an unstable fixing device or a camera movement caused by a user's movement.

The most important element for this camera module to obtain an image is an imaging lens that forms an image. Recently, interest in high efficiency such as high image quality and high resolution is increasing, and research on an optical system including plurality of lenses is being conducted in order to realize this. For example, research using a plurality of imaging lenses having positive (+) and/or negative (−) refractive power to implement a high-efficiency optical system is being conducted. However, when a plurality of lenses is included, there is a problem in that it is difficult to derive excellent optical properties and aberration properties. In addition, when a plurality of lenses is included, the overall length, height, etc. may increase due to the thickness, interval, size, etc. of the plurality of lenses, thereby increasing the overall size of the module including the plurality of lenses. In addition, the size of the image sensor is increasing to realize high-resolution and high-definition. However, when the size of the image sensor increases, the TTL (Total Track Length) of the optical system including the plurality of lenses also increases, thereby increasing the thickness of the camera and the mobile terminal including the optical system. When the optical system includes a plurality of lenses, a zoom, autofocus (AF) function, etc. may be performed by controlling the position of at least one lens or a lens group including at least one lens. However, when the lens or the lens group performs the above function, the movement amount of the lens or the lens group may increase exponentially. Accordingly, the optical system may require a lot of energy for movement of the lens or the lens group, and there is a problem that a large volume is required in consideration of the amount of movement. In addition, when the lens or the lens group is moved, there is a problem in that aberration characteristics according to the movement are deteriorated. Accordingly, there is a problem in that optical characteristics are deteriorated at a specific magnification when zoom and autofocus (AF) functions are performed. Therefore, a new optical system capable of solving the above problems is required.

DISCLOSURE

Technical Problem

An embodiment provides an optical system with improved optical characteristics. An embodiment provides an optical system and a camera module capable of taking pictures at various magnifications. An embodiment provides an optical system and a camera module with improved aberration characteristics at various magnifications. An embodiment provides an optical system and camera module that may be implemented in a small and compact manner.

Technical Solution

An optical system according to an embodiment of the invention comprises first to fourth lens groups arranged along an optical axis from an object side toward a sensor side and including each including at least one lens, wherein the first lens group has a refractive power opposite to that of the fourth lens group, the second lens group has a refractive power opposite to that of the third lens group, the first and fourth lens groups are fixed, the second and third lens groups are moved in a direction of the optical axis, each of the first and fourth lens groups includes at least one lens of a non-circular shape, the non-circular lens has a non-circular ratio (CH/CA) greater than 0.7, the non-circular ratio is a ratio of a minimum clear aperture (CH: clear height) and maximum clear aperture (CA) of a lens surface with a large clear aperture among an object-side surface and a sensor-side surface of the non-circular lens, and the non-circular ratio of at least one lens included in the first lens group may be greater than the non-circular ratio of at least one lens included in the fourth lens group.

According to the invention, the first lens group includes first to third lenses sequentially arranged along the optical axis in a direction from the object side toward the sensor side, and the second lens group includes fourth and fifth lenses sequentially arranged along the optical axis in a direction from the object side toward the sensor side, the third lens group includes sixth and seventh lenses sequentially arranged along the optical axis in the direction from the object side toward the sensor side, and the fourth lens group may include an eighth lens.

According to the invention, the fourth and fifth lenses may be circular lenses with a non-circular ratio of 1. The first and second lenses are non-circular lenses, and the non-circular ratio of the first lens may be smaller than the non-circular ratio of the second lens. The third lens may be a circular lens with a non-circular ratio of 1. The third lens group may include at least one lens of a non-circular shape.

According to the invention, the sixth and seventh lenses are non-circular lenses, and the non-circular ratio of the sixth lens may be greater than the non-circular ratio of the seventh lens. The first lens may have positive refractive power, and the object-side surface of the first lens may have a convex shape.

An optical system according to an embodiment of the invention comprises first to fourth lens groups arranged along an optical axis from an object side toward a sensor side and including each including at least one lens, wherein the first lens group has a refractive power opposite to that of the fourth lens group, the second lens group has a refractive power opposite to that of the third lens group, the first and fourth lens groups are fixed and the second and third lens groups are moved in a direction of the optical axis direction, each of the first and fourth lens groups includes at least one lens of a non-circular shape, and a non-circular ratio of at least one lens included in the second lens group is greater than a non-circular ratio of a non-circular lens included in each of the first and fourth lens groups, when the second and third lens groups are located in a first position, the optical system has a first magnification, and when the second and third lens groups are located in a second position different from the first position, the optical system has a second magnification, and the second magnification may be greater than the first magnification.

According to the invention, when the second and third lens groups are located in the first position, the optical system has a first effective focal length (EFL), and when the second and third lens groups are located in the second position, the optical system may have a second effective focal length greater than the first effective focal length, and m_G2 is a moving distance when the second lens group moves from the first position to the second position, or from the second position to the first position, and TTL (Total track length) is a distance in the optical axis from the object-side surface of a lens closest to an object in the first lens group to an image surface of a sensor, and the following equation may satisfy: $0.05 < m\_G2/TTL < 0.5$.

According to the invention, m_G3 is a moving distance when the third lens group moves from the first position to the second position, or from the second position to the first position, and TTL (Total track length) is a distance in the optical axis from the object-side surface of a lens closest to an object in the first lens group to an image surface of a sensor, and the following equation may satisfy: $0.05 < m\_G3/TTL < 0.5$.

According to an embodiment of the invention, when the second and third lens groups move from the first position to the second position, or from the second position to the first position, a moving distance of the third lens group may be greater than a moving distance of the second lens group. When the second and third lens groups move from the first position to the second position, or from the second position to the first position, the moving distance of each of the second and third lens groups may be 6 mm or less.

A camera module according to an embodiment of the invention includes the optical system and a driving member, and the driving member may control positions of the second and third lens groups.

Advantageous Effects

The optical system and camera module according to the embodiment have various magnifications and can have excellent optical characteristics when various magnifications are provided. In detail, the embodiment includes a plurality of lens groups including at least one lens, and some of the plurality of lens groups may be fixed and others may be movable. At this time, the embodiment may have various magnifications by controlling the moving distance of the moving lens group and may provide an autofocus (AF) function for the subject. The optical system and camera module according to the embodiment may correct aberration characteristics of a plurality of lens groups or complement each other for aberration characteristics that change due to movement. Accordingly, the optical system according to the embodiment may minimize or inhibit changes in chromatic aberration and changes in aberration characteristics that occur when magnification changes.

The optical system and camera module according to the embodiment may control the effective focal length (EFL) by moving only some lens groups among a plurality of lens groups and minimize the moving distance of the moving lens groups. Accordingly, the optical system may reduce the moving distance of the lens group that moves according to the change in operation mode, and minimize other power consumption for moving the lens group. In the optical system, at least one lens included in the fixed group and the moving group may have a non-circular shape. Accordingly, the height of the optical system may be reduced while maintaining optical performance, and a space in which lens groups disposed between a plurality of lens groups may be structurally arranged may be secured.

The optical system and camera module according to the embodiment may adjust magnification by moving a lens group other than the first lens group adjacent to the subject among a plurality of lens groups. Accordingly, the optical system may have a constant TTL value even when the lens group moves according to a change in magnification. Accordingly, the optical system and the camera module including it may be provided in a slimmer structure.

DESCRIPTION OF DRAWINGS

FIG. 11 is a diagram showing a camera module according to an embodiment applied to a mobile terminal.

BEST MODE

Figure 1:
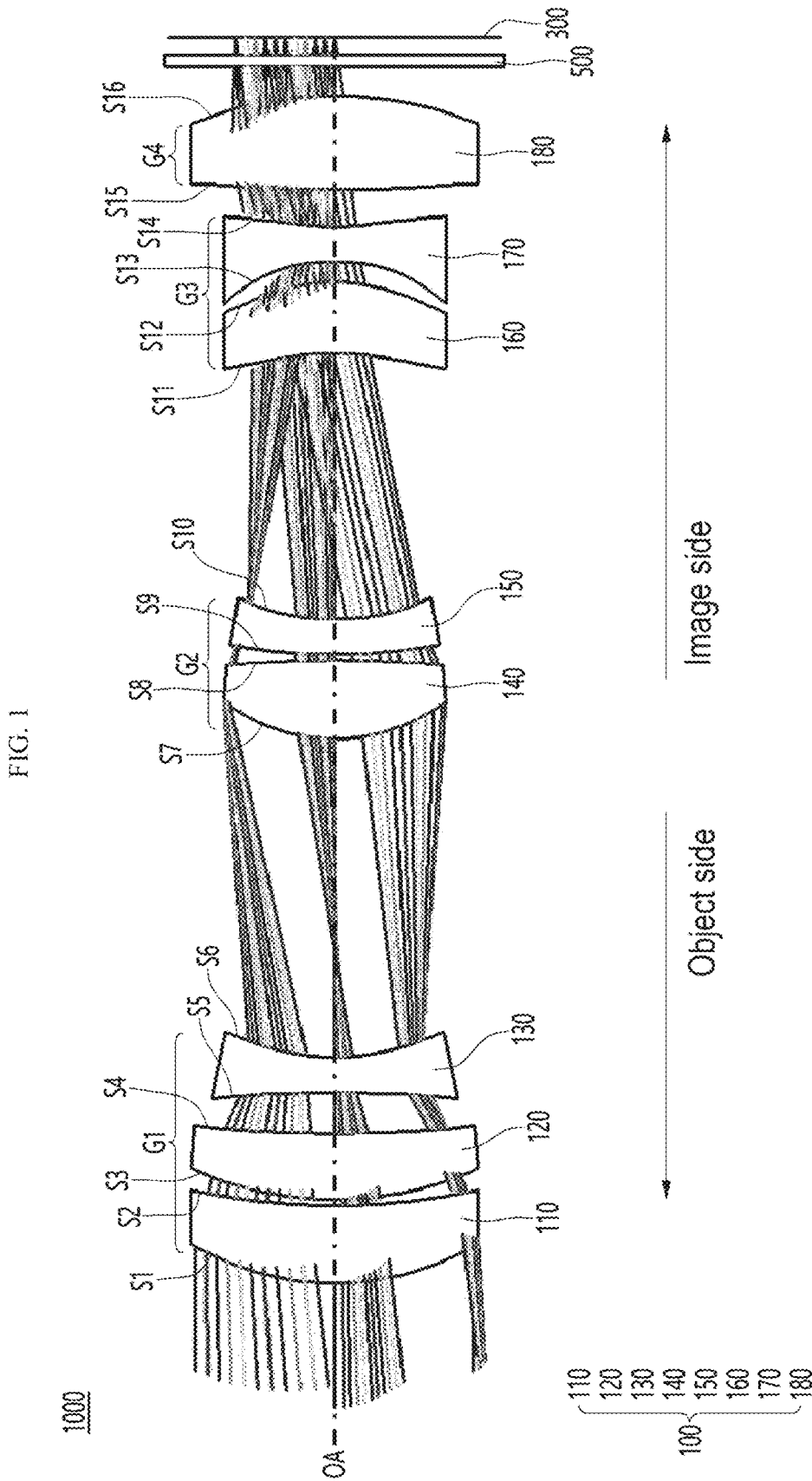
FIG. 1 is a configuration diagram of an optical system according to an embodiment operating in a first mode.

Hereinafter, preferred embodiments of the invention will be described in detail with reference to the accompanying drawings. A technical spirit of the invention is not limited to some embodiments to be described, and may be implemented in various other forms, and one or more of the components may be selectively combined and substituted for use within the scope of the technical spirit of the invention. In addition, the terms (including technical and scientific terms) used in the embodiments of the invention, unless specifically defined and described explicitly, may be interpreted in a meaning that may be generally understood by those having ordinary skill in the art to which the invention pertains, and terms that are commonly used such as terms defined in a dictionary should be able to interpret their meanings in consideration of the contextual meaning of the relevant technology. The terms used in the embodiments of the invention are for explaining the embodiments and are not intended to limit the invention. In this specification, the singular forms also may include plural forms unless otherwise specifically stated in a phrase, and in the case in which at least one (or one or more) of A and (and) B, C is stated, it may include one or more of all combinations that may be combined with A, B, and C. In describing the components of the embodiments of the invention, terms such as first, second, A, B, (a), and (b) may be used. Such terms are only for distinguishing the component from other component, and may not be determined by the term by the nature, sequence or procedure etc. of the corresponding constituent element. And when it is described that a component is "connected", "coupled" or "joined" to another component, the description may include not only being directly connected, coupled or joined to the other component but also being "connected", "coupled" or "joined" by another component between the component and the other component. In addition, in the case of being described as being formed or disposed "above (on)" or "below (under)" of each component, the description includes not only when two components are in direct contact with each other, but also when one or more other components are formed or disposed between the two components. In addition, when expressed as "above (on)" or "below (under)", it may refer to a downward direction as well as an upward direction with respect to one element.

A convex surface of the lens may mean that the lens surface of a region corresponding to the optical axis has a convex shape with respect to the optical axis, and a concave surface of the lens means that the lens surface of the region corresponding to the optical axis has a concave shape. In addition, "object-side surface" may refer to the surface of the lens facing the object side with respect to the optical axis, and "sensor-side surface" may refer to the surface of the lens facing the image surface (image sensor) with respect to the optical axis. In addition, a center thickness of the lens may mean a thickness in a direction of the optical axis of the lens on the optical axis. Also, a vertical direction may mean a direction perpendicular to the optical axis, and an end of the lens or the lens surface may mean the end of the effective region of the lens through which the incident light passes. In addition, a size of the clear aperture of the lens surface may have a measurement error of up to ±0.4 mm depending on a measurement method or the like.

Figure 2:
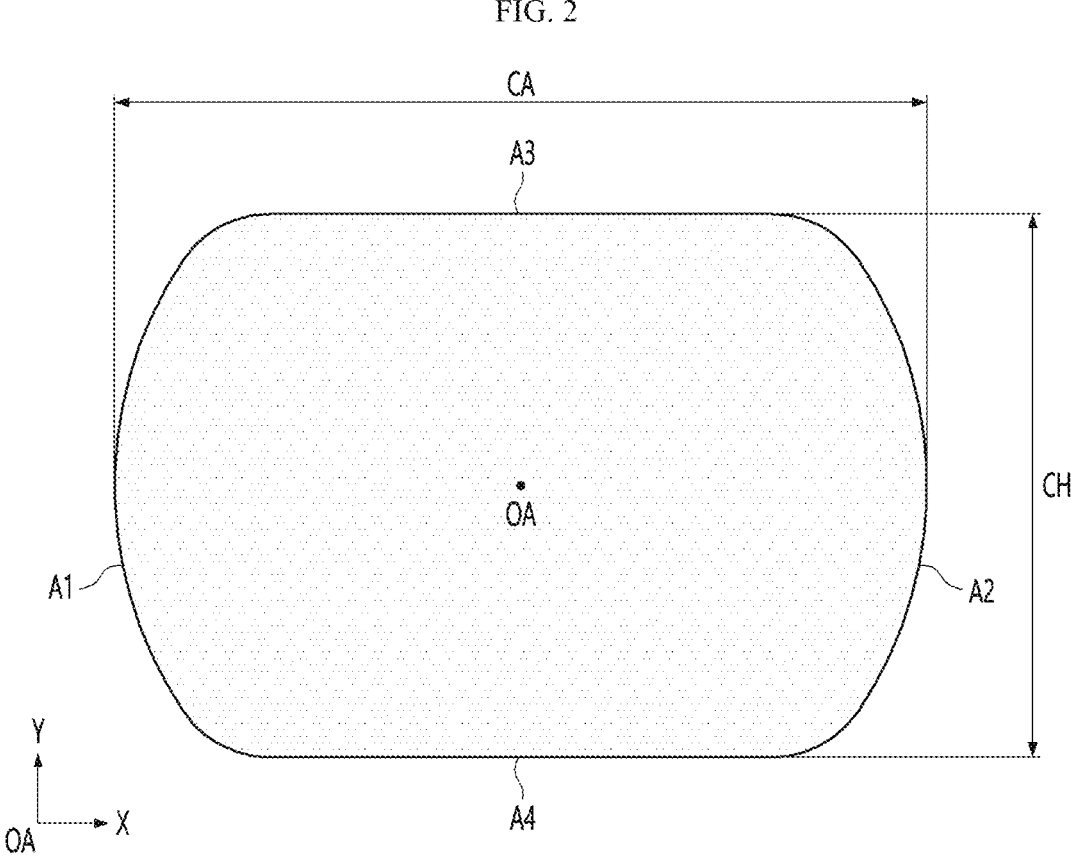
FIG. 2 is a diagram for explaining a lens of a non-circular shape.
Figure 3:
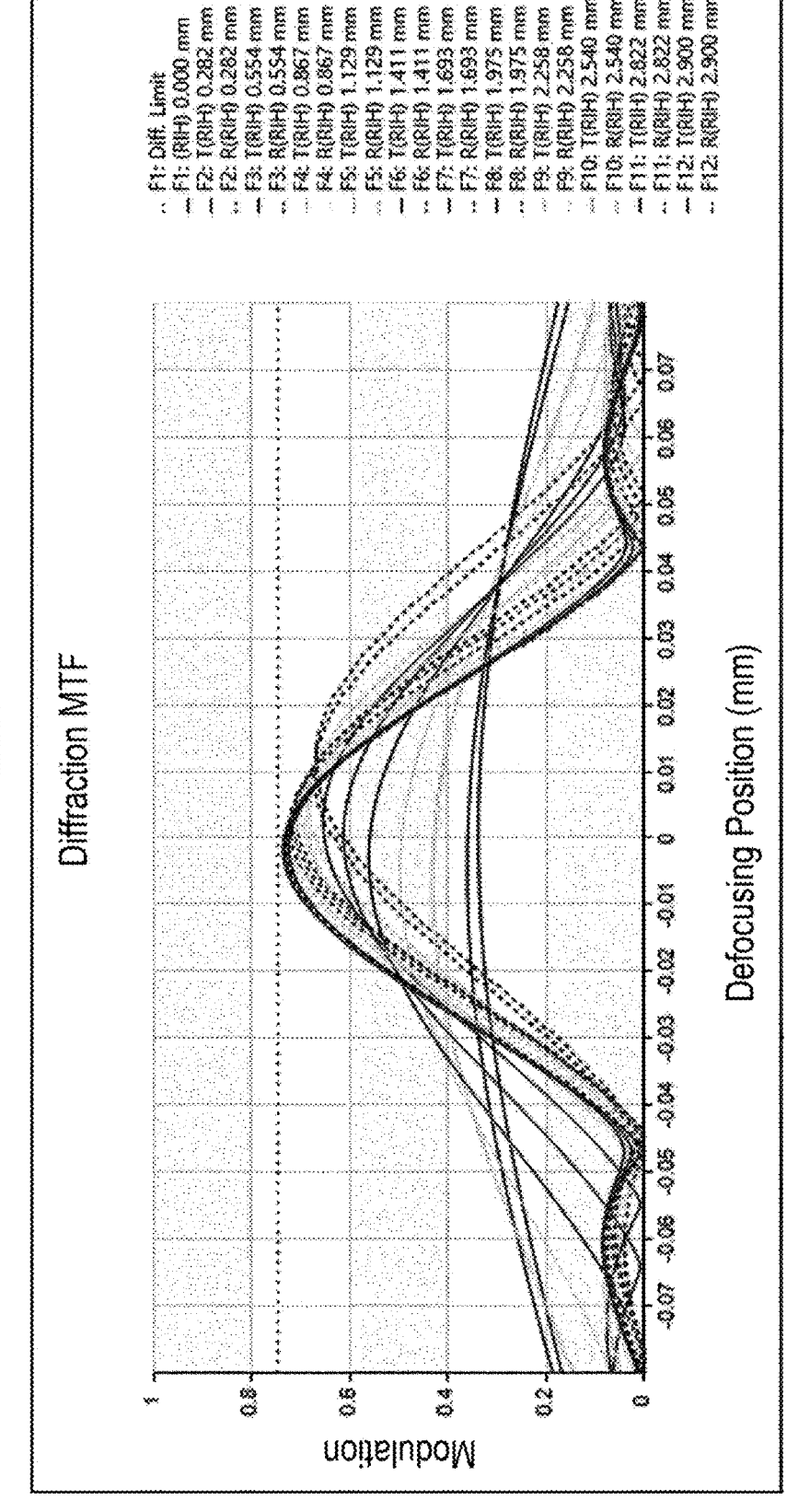
FIG. 3 is a graph of the diffraction MTF of an optical system operating in the first mode.
Figure 4:
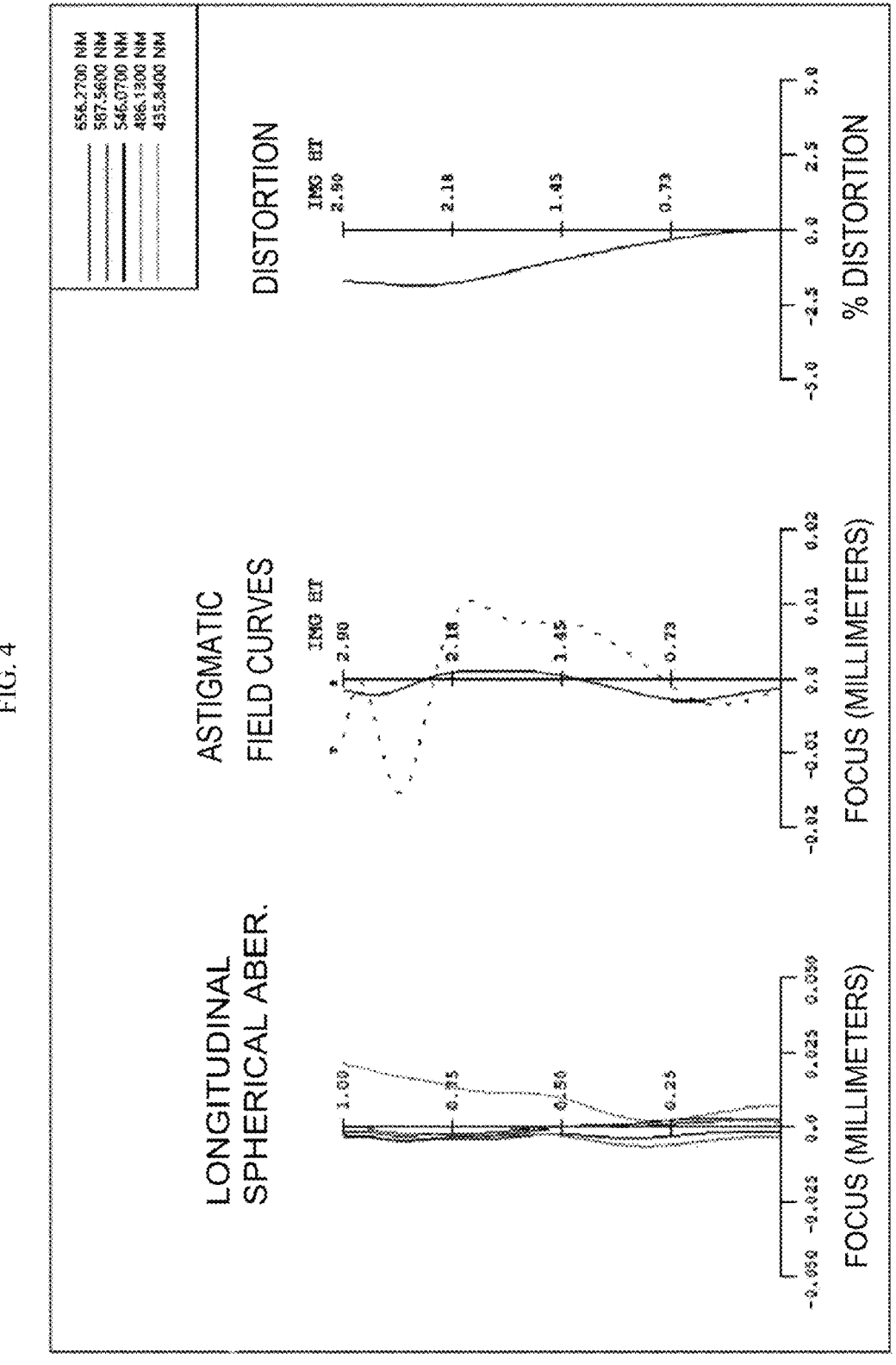
FIG. 4 is a graph showing aberration characteristics of an optical system operating in the first mode.
Figure 5:
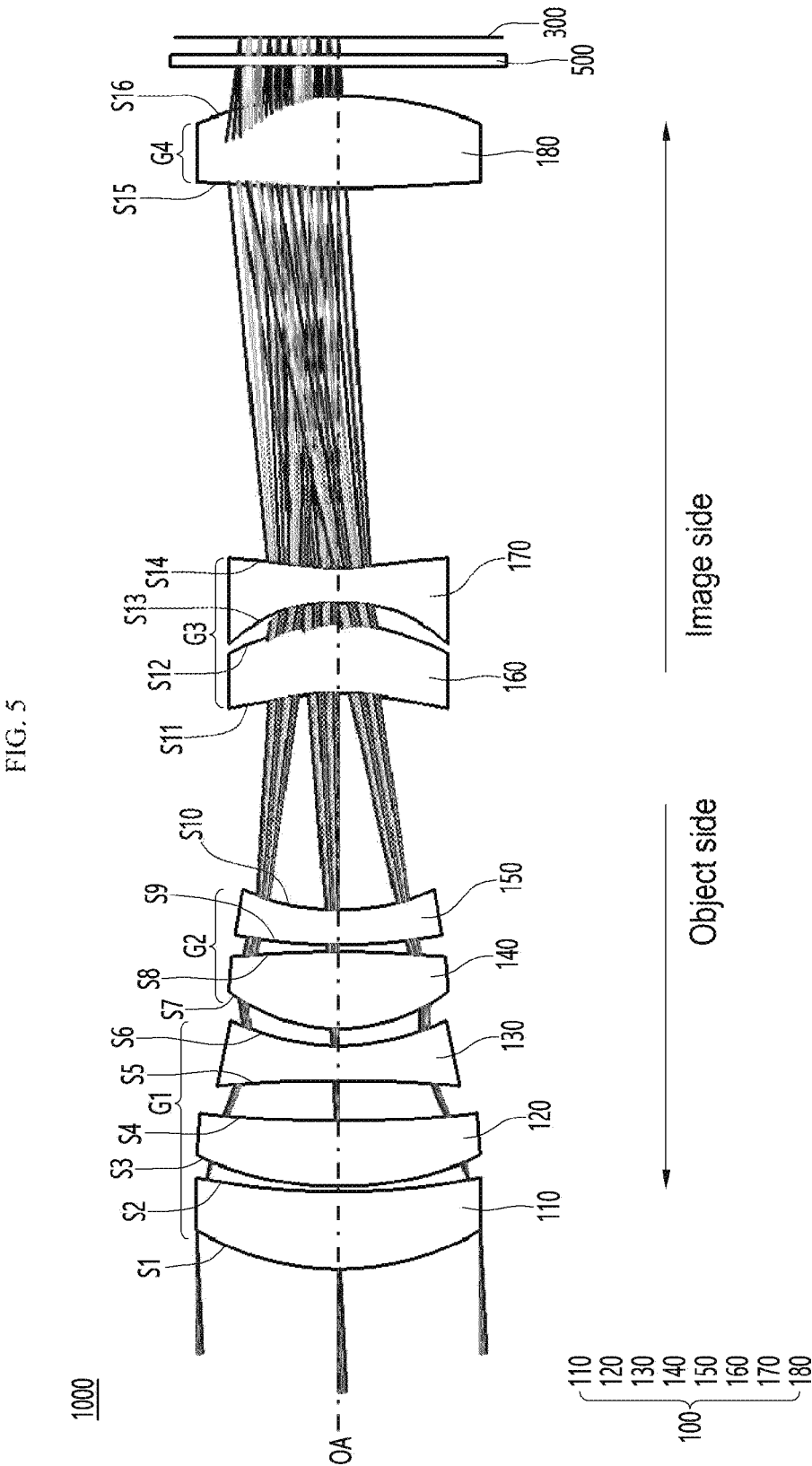
FIG. 5 is a configuration diagram of an optical system according to an embodiment operating in a second mode.
Figure 6:
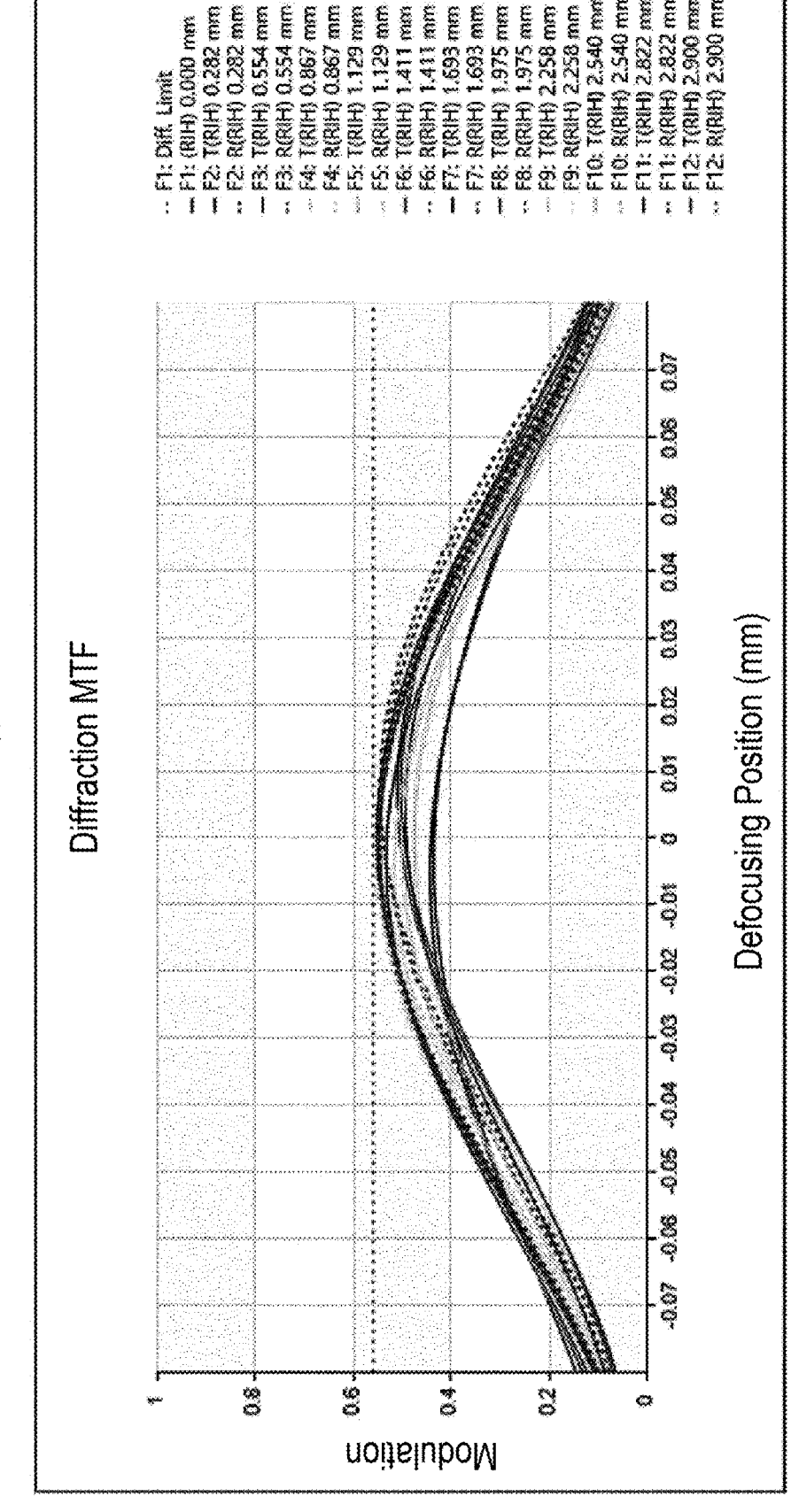
FIG. 6 is a graph of the diffraction MTF of an optical system operating in the second mode.
Figure 7:
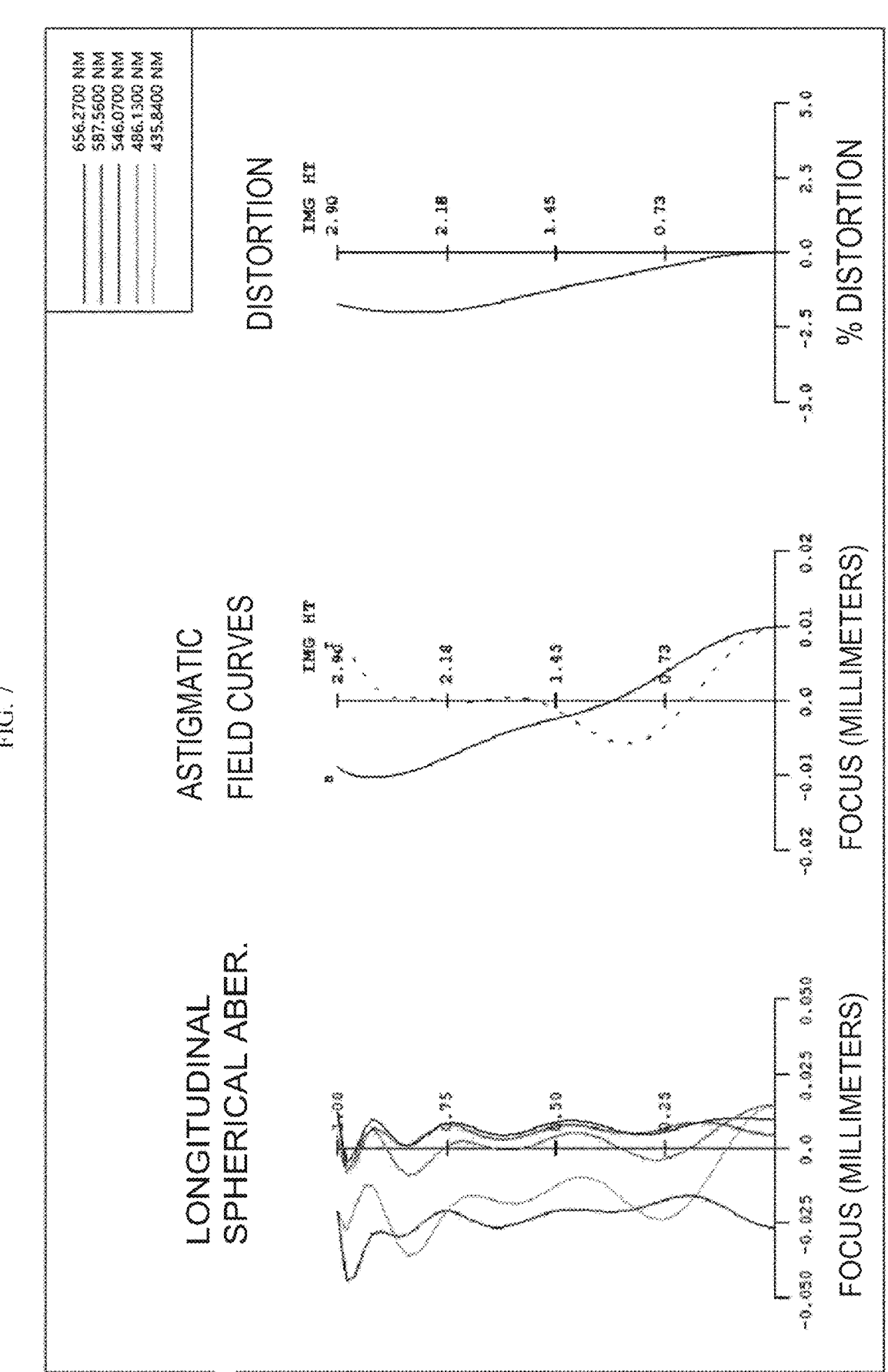
FIG. 7 is a graph showing aberration characteristics of an optical system operating in the second mode.
Figure 8:
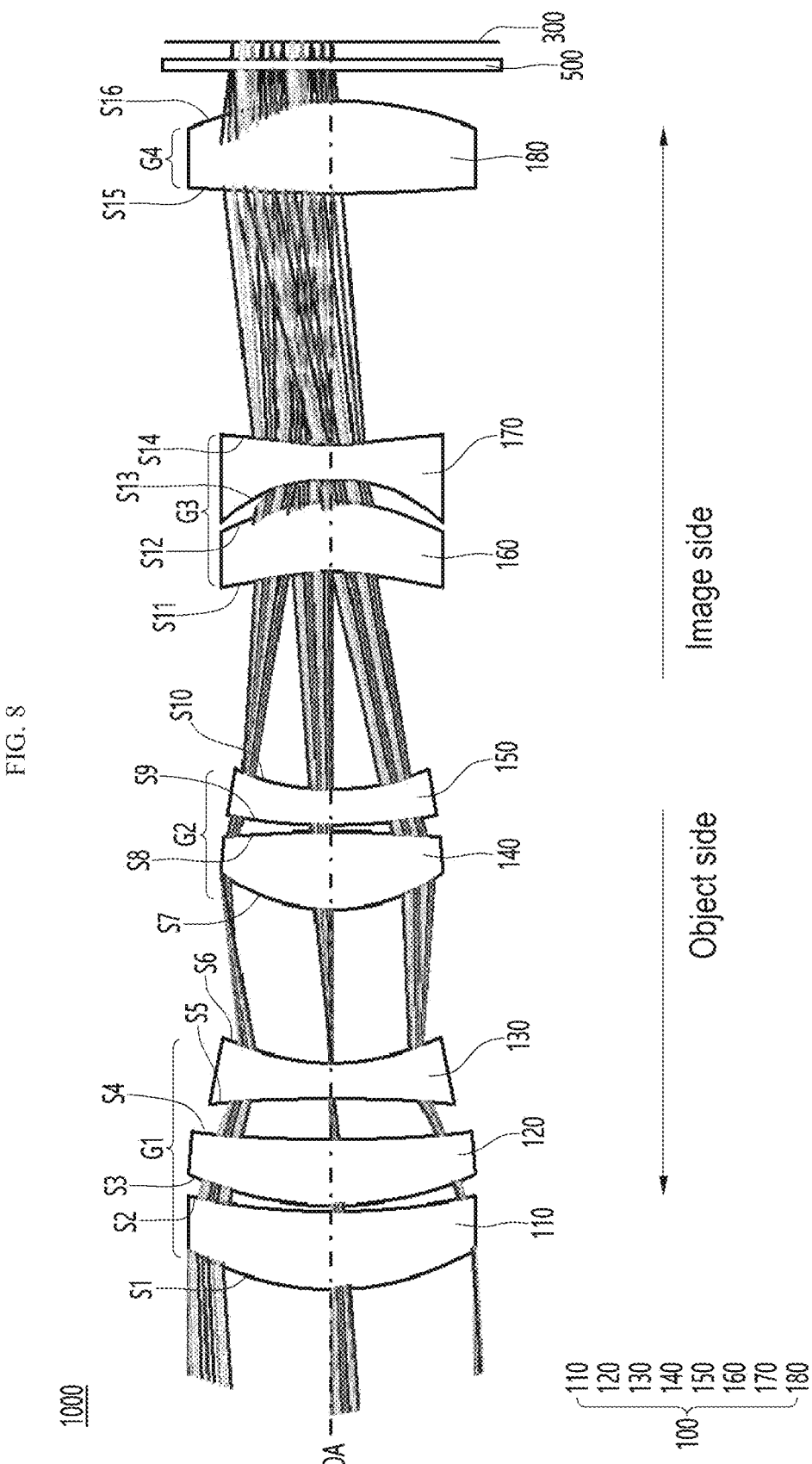
FIG. 8 is a configuration diagram of an optical system according to an embodiment operating in a third mode.
Figure 9:
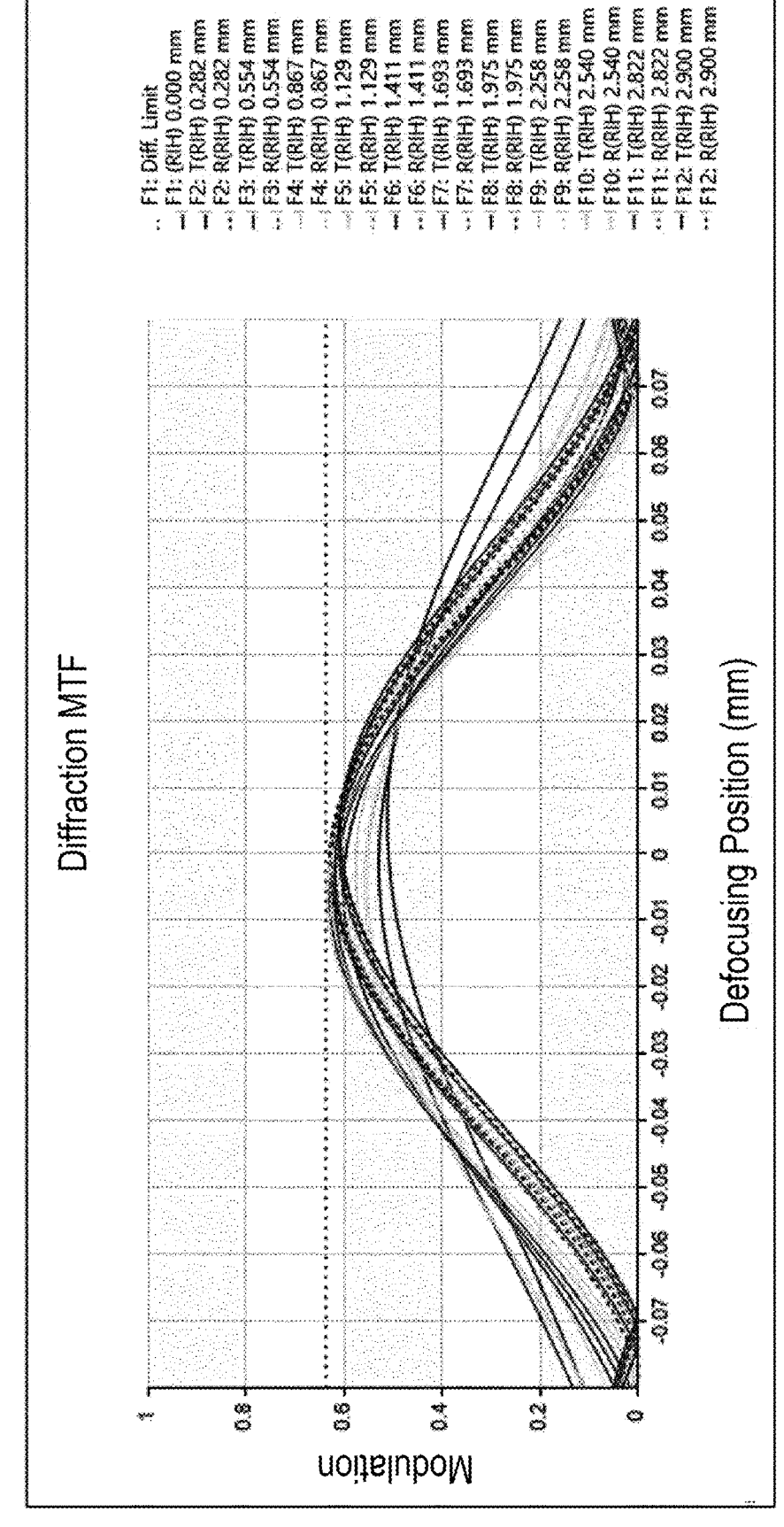
FIG. 9 is a graph of the diffraction MTF of an optical system operating in the third mode.
Figure 10:
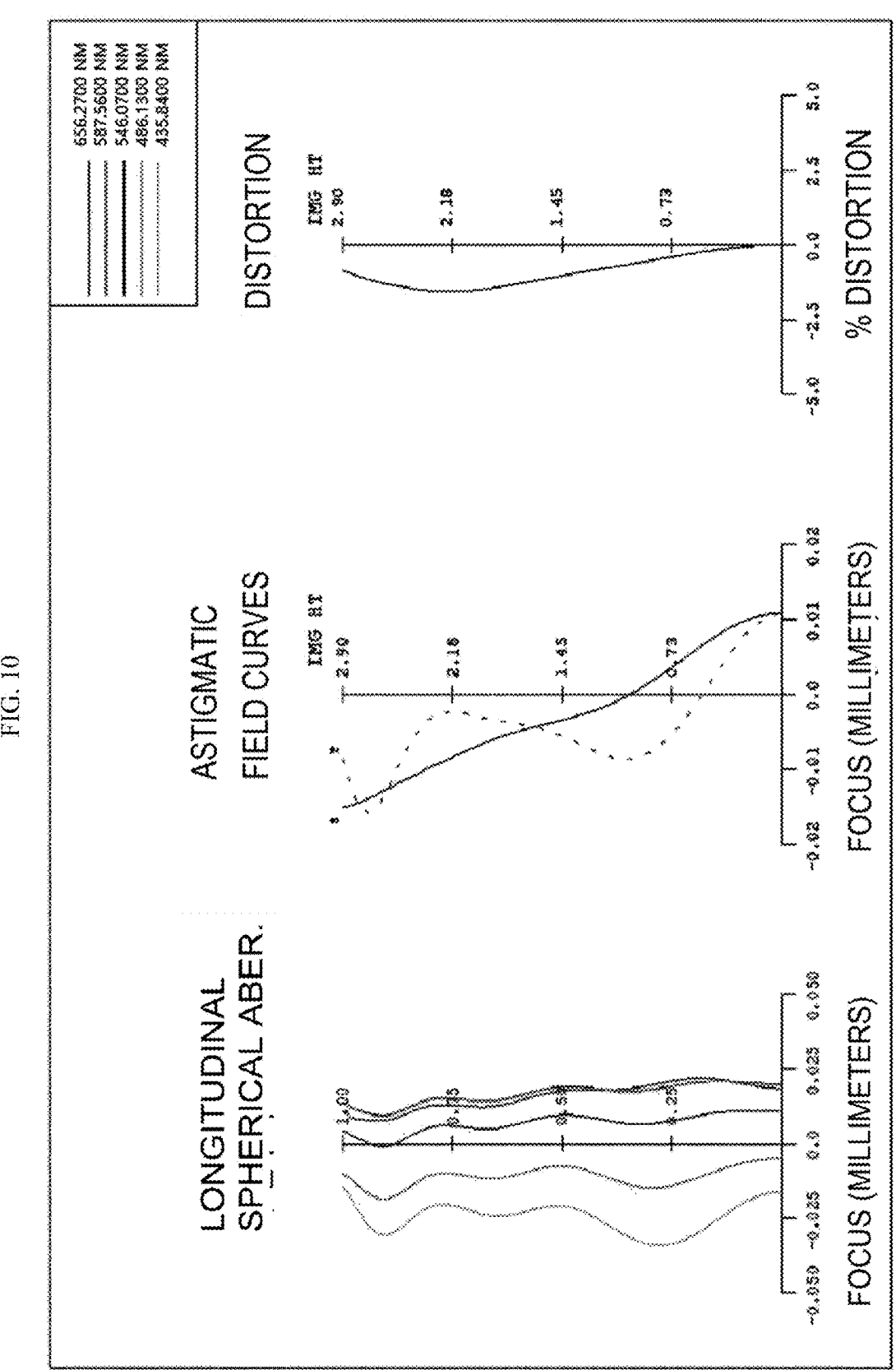
FIG. 10 is a graph showing aberration characteristics of an optical system operating in the third mode.

FIG. 1 is a diagram illustrating the configuration of an optical system operating in a first mode according to an embodiment, and FIG. 2 is a diagram illustrating a lens of a non-circular shape. Additionally, FIGS. 3 and 4 are graphs showing the diffraction MTF and aberration characteristics of an optical system operating in the first mode. FIG. 5 is a configuration diagram of an optical system operating in the second mode according to an embodiment, and FIGS. 6 and 7 are graphs showing diffraction MTF and aberration characteristics of the optical system operating in the second mode. FIG. 8 is a configuration diagram of an optical system operating in the third mode according to an embodiment, and FIGS. 9 and 10 are graphs showing the diffraction MTF and aberration characteristics of the optical system operating in the third mode.

Referring to FIGS. 1 to 10, an optical system 1000 according to an embodiment may include a plurality of lens groups. In detail, the optical system 1000 includes a plurality of lens groups, and each of the plurality of lens groups may include at least one lens. For example, the optical system 1000 may include a first lens group G1, a second lens group G2, a third lens group G3, and a fourth lens group G4 which are sequentially arranged along the optical axis OA from the object side toward the sensor. Each of the first to fourth lens groups G1, G2, G3, and G4 may have positive (+) or negative (−) refractive power.

The first lens group G1 may have a refractive power opposite to that of the second lens group G2. For example, the first lens group G1 may have negative (−) refractive power, and the second lens group G2 may have positive (+) refractive power. Additionally, the second lens group G2 may have a refractive power opposite to that of the third lens group G3. For example, the second lens group G2 may have positive (+) refractive power, and the third lens group G3 may have negative (−) refractive power. Additionally, the third lens group G3 may have a refractive power opposite to that of the fourth lens group G4. For example, the third lens group G3 may have negative (−) refractive power, and the fourth lens group G4 may have positive (+) refractive power. The fourth lens group G4 may have a refractive power opposite to that of the first lens group G1.

The first lens group G1 and the second lens group G2 may have different focal lengths. In detail, since the first and second lens groups G1 and G2 have opposite refractive powers as described above, the focal length of the second lens group G2 may have a sign (+,−) opposite to the focal length of the first lens group G1. For example, the focal length of the first lens group G1 may have a positive (+) sign, and the focal length of the second lens group G2 may have a negative (−) sign.

The second lens group G2 and the third lens group G3 may have different focal lengths. In detail, since the second and third lens groups G2 and G3 have opposite refractive powers as described above, the focal length of the second lens group G2 may have a sign (+,−) opposite to the focal length of the third lens group G3. For example, the focal length of the second lens group G2 may have a negative (−) sign, and the focal length of the third lens group G3 may have a positive (+) sign.

The third lens group G3 and the fourth lens group G4 may have different focal lengths. In detail, as the third and fourth lens groups G3 and G4 have opposite refractive powers as described above, the focal length of the third lens group G3 may have a sign (+,−) opposite to the focal length of the fourth lens group G4. For example, the focal length of the third lens group G3 may have a positive (+) sign, and the focal length of the fourth lens group G4 may have a negative (−) sign. That is, the fourth lens group G4 may have a refractive power opposite to that of the first lens group G1.

The absolute values of the focal lengths of each of the first to fourth lens groups G1, G2, G3, and G4 may have large values in that order the first lens group G1, the fourth lens group G4, and the third lens group G3, and the second lens group G2

The optical system 1000 may be provided so that at least one lens group among the first to fourth lens groups G1, G2, G3, and G4 can move in the direction of the optical axis OA. In detail, at least one lens group among the plurality of lens groups G1, G2, G3, and G4 may be provided to be movable, and the remaining lens groups may be arranged in fixed positions. For example, the first lens group G1 and the fourth lens group G4 among the plurality of lens groups G1, G2, G3, and G4 may be arranged at a fixed position, and the second lens group G2 and the third lens group G3 may be provided to be movable in the direction of the optical axis OA. Accordingly, the optical system 1000 may provide various magnifications by moving the lens groups.

Hereinafter, the first to fourth lens groups G1, G2, G3, and G4 will be described in more detail. The first lens group G1 may include at least one lens. The first lens group G1 may include a plurality of lenses. In detail, the first lens group G1 may include two or more lenses having opposite refractive powers. For example, the first lens group G1 may include three lenses. The plurality of lenses included in the first lens group G1 may have set distance. In detail, the distance between the plurality of lenses included in the first lens group G1 may be constant without changing even if the operation mode, which will be described later, changes. For example, the distance between the first lens 110 and the second lens 120 and the distance between the second lens 120 and the third lens 130 do not change depending on the operation mode and may be constant. Here, the distance between the plurality of lenses may mean a distance between adjacent lenses in the optical axis OA.

The second lens group G2 may include at least one lens. The second lens group G2 may include a plurality of lenses. In detail, the second lens group G2 may include two or more lenses having opposite refractive powers. The number of lenses included in the second lens group G2 may be less than the number of lenses included in the first lens group G1. For example, the second lens group G2 may include two lenses. The plurality of lenses included in the second lens group G2 may have set distance. In detail, the distance between the plurality of lenses included in the second lens group G2 may be constant without changing even if the operation mode, which will be described later, changes. For example, the distance between the fourth lens 140 and the fifth lens 150 may be constant without changing depending on the operation mode.

The third lens group G3 may include at least one lens. The third lens group G3 may include a plurality of lenses. In detail, the third lens group G3 may include two or more lenses having opposite refractive powers. The number of lenses included in the third lens group G3 may be less than the number of lenses included in the first lens group G1. Additionally, the number of lenses included in the third lens group G3 may be equal to the number of lenses included in the second lens group G2. For example, the third lens group G3 may include two lenses. The plurality of lenses included in the third lens group G3 may have set distance. In detail, the distance between the plurality of lenses included in the third lens group G3 may be constant without changing even if the operation mode, which will be described later, changes. For example, the distance between the sixth lens 160 and the seventh lens 170 may be constant without changing depending on the operation mode.

The fourth lens group G4 may include at least one lens. The number of lenses included in the fourth lens group G4 may be less than the number of lenses included in the first lens group G1. Additionally, the number of lenses included in the fourth lens group G4 may be less than or equal to the number of lenses included in the second lens group G2 and the third lens group G3. For example, the fourth lens group G4 may include one lens. Lens included in the fourth lens group G4 may have a set distance. In detail, the distance between the lens included in the fourth lens group G4 and the image sensor 300 may be constant without changing even if the operation mode, which will be described later, changes. Additionally, when the fourth lens group G4 includes a plurality of lenses, the distance between the plurality of lenses may be constant without changing even when the operation mode changes.

The optical system 1000 may include a plurality of lens groups G1, G2, G3, and G4 sequentially arranged from the object side toward the sensor. In addition, the optical system 1000 includes a plurality of lenses 100 included in the lens groups G1, G2, G3, and G4, for example, first to eighth lenses 110, 120, 130, 140, 150, 160, 170, and 180. In this case, the first lens group G1 may include the first to third lenses 110, 120, and 130, and the second lens group G2 may include the fourth and fifth lenses 140 and 150. Additionally, the third lens group G3 may include the sixth and seventh lenses 160 and 170, and the fourth lens group G4 may include the eighth lens 180. The first to eighth lenses 110, 120, 130, 140, 150, 160, 170, and 180 may be sequentially arranged along the optical axis OA of the optical system 1000.

Each of the plurality of lenses 100 may include an effective region and a non-effective region. The effective region may be a region through which light incident on each of the first to eighth lenses 110, 120, 130, 140, 150, 160, 170, and 180 passes. That is, the effective region may be a region in which the incident light is refracted to implement optical characteristics. The non-effective region may be arranged around the effective region. The non-effective region may be a region where the light is not incident. That is, the non-effective region may be a region unrelated to the optical characteristics. Additionally, the non-effective region may be a region fixed to a barrel (not shown) that accommodates the lens.

The optical system 1000 may include an image sensor 300. The image sensor 300 may detect light. The image sensor 300 may detect light that sequentially passes through the plurality of lenses 100, for example, the first to eighth lenses 110, 120, 130, 140, 150, 160, 170, and 180. The image sensor 300 may include a charge coupled device (CCD) or a complementary metal oxide semiconductor (CMOS).

The optical system 1000 may further include a filter 500. The filter 500 may be disposed between the plurality of lenses 100 and the image sensor 300. The filter 500 may be disposed between the image sensor 300 and the fourth lens group G4 closest to the image sensor 300 among the plurality of lens groups G1, G2, G3, and G4. For example, the filter 500 may be disposed between the image sensor 300 and the eighth lens 180 of the fourth lens group G4. The filter 500 may include at least one of an optical filter such as an infrared filter or a cover glass. The filter 500 may pass light in a set wavelength band and filter light in a different wavelength band. When the filter 500 includes an infrared filter, radiant heat emitted from external light may be blocked from being transmitted to the image sensor 300. Additionally, the filter 500 may transmit visible light and reflect infrared rays.

The optical system 1000 may include an aperture stop (not shown). The aperture stop may control the amount of light incident on the optical system 1000. The aperture stop may be located in front of the first lens 110 or between two lenses selected from the first to eighth lenses 110, 120, 130, 140, 150, 160, 170, and 180. For example, the aperture stop may be disposed between the third lens 130 and the fourth lens 140.

At least one lens among the first to eighth lenses 110, 120, 130, 140, 150, 160, 170, and 180 may function as an aperture stop. For example, the object-side surface or the sensor-side surface of one lens selected from among the first to eighth lenses 110, 120, 130, 140, 150, 160, 170, and 180 may serve as an aperture stop to control the amount of light. For example, at least one lens surface of the sensor-side surface (sixth surface S6) of the third lens 130 and the object-side surface (seventh surface S7) of the fourth lens 140 may serve as an aperture stop.

The optical system 1000 may further include a light path changing member (not shown). The light path changing member may change the path of light by reflecting light incident from the outside. The light path changing member may include a reflector or prism. For example, the light path changing member may include a right-angle prism. When the light path changing member includes a right-angled prism, the light path changing member may change the path of light by reflecting the path of incident light at an angle of 90 degrees. The light path changing member may be disposed closer to the object than the plurality of lenses 100. That is, when the optical system 1000 includes the light path changing member, the light path changing member, the first lens 110, the second lens 120, the third lens 130, The fourth lens 140, the fifth lens 150, the sixth lens 160, the seventh lens 170, the eighth lens 180, the filter 500, and the image sensor 300 may be arranged in this order. The light path changing member may change the path of light incident from the outside in a set direction. For example, the light path changing member directs the path of the light incident on the light path changing member in the first direction in a second direction (in the optical axis OA direction in which the plurality of lenses 100 are spaced apart in the drawing), which is the arrangement direction of the plurality of lenses 100.

When the optical system 1000 includes a light path changing member, the optical system may be applied to a folded camera, thereby reducing the thickness of the camera. In detail, when the optical system 1000 includes the light path change member, light incident in a direction (first direction) perpendicular to the surface of the device to which the optical system 1000 is applied may be changed in a direction (second direction) parallel to the surface of the device. Accordingly, the optical system 1000 including a plurality of lenses 100 may have a thinner thickness within the device, and thus the height of the device may be reduced. For example, when the optical system 1000 does not include the light path changing member, the plurality of lenses 100 within the device may be disposed to extend in a direction (first direction) perpendicular to the surface of the device. Accordingly, the optical system 1000 including the plurality of lenses 100 has a high height in the direction (first direction) perpendicular to the surface of the device, and thus it may be difficult to form a thin thickness of the optical system 1000 and the device including the same.

However, when the optical system 1000 includes the light path changing member, the plurality of lenses 100 may be arranged to extend in a direction (second direction) parallel to the surface of the device. That is, the optical system 1000 is arranged so that the optical axis OA is parallel to the surface of the device and may be applied to a folded camera. Accordingly, the optical system 1000 including the plurality of lenses 100 may have a low height in a direction perpendicular to the surface of the device. Accordingly, the camera including the optical system 1000 may have a thin thickness within the device, and the thickness of the device may also be reduced.

The light path changing member may be disposed between two lenses of the plurality of lenses 100, or between the image sensor 300 and the last lens closest to the image sensor 300 among the plurality of lenses 100. The light path changing member may be provided in plural numbers. In detail, a plurality of light path changing members may be disposed between the object and the image sensor 300. For example, the light path changing member may include a first light path changing member disposed closer to the object than the plurality of lenses 100 and a second light path changing member disposed between the last lens and the image sensor 300. Accordingly, the optical system 1000 may have various shapes and heights depending on the camera to which it is applied, and may have improved optical performance.

To describe the plurality of lenses 100 again, the optical system 1000 includes first to eighth lenses 110, 120, 130, 140, 150, 160, 170, and 180 sequentially arranged along the optical axis OA from the object side toward the sensor. The first lens 110 may be disposed closest to the object among the plurality of lenses 100, and the eighth lens 180 may be disposed closest to the image sensor 300.

The first lens 110 may have positive (+) refractive power on the optical axis OA. The first lens 110 may include plastic or glass. The first lens 110 may include a first surface S1 defined as an object-side surface and a second surface S2 defined as a sensor-side surface. The first surface S1 may have a convex shape on the optical axis OA, and the second surface S2 may have a concave shape on the optical axis OA. That is, the first lens 110 may have a meniscus shape that is convex toward the object on the optical axis OA. Alternatively, the first surface S1 may have a convex shape on the optical axis OA, and the second surface S2 may have a convex shape on the optical axis OA. That is, the first lens 110 may have a shape in which both sides are convex on the optical axis OA. At least one of the first surface S1 and the second surface S2 may be an aspherical surface. For example, both the first surface S1 and the second surface S2 may be aspherical.

The second lens 120 may have positive (+) or negative (−) refractive power on the optical axis OA. The second lens 120 may include plastic or glass. The second lens 120 may include a third surface S3 defined as the object-side surface and a fourth surface S4 defined as the sensor-side surface. The third surface S3 may have a convex shape on the optical axis OA, and the fourth surface S4 may have a concave shape on the optical axis OA. That is, the second lens 120 may have a meniscus shape that is convex toward the object on the optical axis OA. Alternatively, the third surface S3 may have a convex shape on the optical axis OA, and the fourth surface S4 may have a convex shape. That is, the second lens 120 may have a shape in which both sides are convex on the optical axis OA. Alternatively, the third surface S3 may have a concave shape on the optical axis OA, and the fourth surface S4 may have a convex shape on the optical axis OA. That is, the second lens 120 may have a meniscus shape that is convex toward the sensor on the optical axis OA. Alternatively, the third surface S3 may have a concave shape on the optical axis OA, and the fourth surface S4 may have a concave shape on the optical axis OA. That is, the second lens 120 may have a shape in which both sides are concave on the optical axis OA. At least one of the third surface S3 and the fourth surface S4 may be an aspherical surface. For example, both the third surface S3 and the fourth surface S4 may be aspherical.

The third lens 130 may have a refractive power opposite to that of the first lens 110 on the optical axis OA. That is, the third lens 130 may have negative (−) refractive power. The third lens 130 may include plastic or glass. The third lens 130 may include a fifth surface S5 defined as the object-side surface and a sixth surface S6 defined as the sensor-side surface. The fifth surface S5 may have a convex shape on the optical axis OA, and the sixth surface S6 may have a concave shape on the optical axis OA. That is, the third lens 130 may have a meniscus shape that is convex toward the object on the optical axis OA. Alternatively, the fifth surface S5 may have a concave shape on the optical axis OA, and the sixth surface S6 may have a concave shape on the optical axis OA. That is, the third lens 130 may have a shape in which both sides are concave on the optical axis OA. At least one of the fifth surface S5 and the sixth surface S6 may be an aspherical surface. For example, both the fifth surface S5 and the sixth surface S6 may be aspherical.

In the first lens group G1, the first lens 110 closest to the object may have a refractive power opposite to that of the third lens 130 closest to the image sensor 300. Accordingly, the first lens group G1 may mutually compensate for chromatic aberration generated by the plurality of lenses 110, 120, and 130 included in the first lens group G1.

The third lens 130 adjacent to the second lens group G2 in the first lens group G1 may have the highest refractive index among the first lens group G1. For example, the refractive index of the third lens 130 may be greater than 1.6. Accordingly, the light provided from the first lens group G1 to the second lens group G2 is controlled to reduce the lens size of the second lens group G2 disposed after the first lens group G1.

The fourth lens 140 may have positive (+) or negative (−) refractive power on the optical axis OA. The fourth lens 140 may include plastic or glass. The fourth lens 140 may include a seventh surface S7 defined as the object-side surface and an eighth surface S8 defined as the sensor-side surface. The seventh surface S7 may have a convex shape on the optical axis OA, and the eighth surface S8 may have a concave shape on the optical axis OA. That is, the fourth lens 140 may have a meniscus shape that is convex toward the object on the optical axis OA. Alternatively, the seventh surface S7 may be convex on the optical axis OA, and the eighth surface S8 may be convex on the optical axis OA. That is, the fourth lens 140 may have a shape in which both sides are convex on the optical axis OA. At least one of the seventh surface S7 and the eighth surface S8 may be an aspherical surface. For example, both the seventh surface S7 and the eighth surface S8 may be aspherical.

The fifth lens 150 may have positive (+) or negative (−) refractive power on the optical axis OA. The fifth lens 150 may have a refractive power opposite to that of the fourth lens 140 on the optical axis OA. The fifth lens 150 may include plastic or glass. The fifth lens 150 may include a ninth surface S9 defined as the object-side surface and a tenth surface S10 defined as the sensor-side surface. The ninth surface S9 may have a convex shape on the optical axis OA, and the tenth surface S10 may have a concave shape on the optical axis OA. That is, the fifth lens 150 may have a meniscus shape that is convex toward the object on the optical axis OA. Alternatively, the ninth surface S9 may have a convex shape on the optical axis OA, and the tenth surface S10 may have a convex shape on the optical axis OA. That is, the fifth lens 150 may have a shape in which both sides are convex on the optical axis OA. Alternatively, the ninth surface S9 may have a concave shape on the optical axis OA, and the tenth surface S10 may have a convex shape on the optical axis OA. That is, the fifth lens 150 may have a meniscus shape that is convex toward the sensor on the optical axis OA. Alternatively, the ninth surface S9 may have a concave shape on the optical axis OA, and the tenth surface S10 may have a concave shape on the optical axis OA. That is, the fifth lens 150 may have a shape in which both sides are concave on the optical axis OA. At least one of the ninth surface S9 and the tenth surface S10 may be an aspherical surface. For example, both the ninth surface S9 and the tenth surface S10 may be aspherical.

In the second lens group G2, the fourth lens 140 closest to the object may have a refractive power opposite to that of the fifth lens 150 closest to the image sensor 300. Additionally, the difference in Abbe numbers between the fourth lens 140 and the fifth lens 150 may be greater than 20. Accordingly, the second lens group G2 may minimize the change in chromatic aberration caused by the position changing according to the mode change.

The sixth lens 160 may have positive (+) or negative (−) refractive power on the optical axis OA. The sixth lens 160 may include plastic or glass. The sixth lens 160 may include an eleventh surface S11 defined as the object-side surface and a twelfth surface S12 defined as the sensor-side surface. The eleventh surface S11 may have a convex shape on the optical axis OA, and the twelfth surface S12 may have a concave shape on the optical axis OA. That is, the sixth lens 160 may have a meniscus shape that is convex toward the object on the optical axis OA. Alternatively, the eleventh surface S11 may have a convex shape on the optical axis OA, and the twelfth surface S12 may have a convex shape on the optical axis OA. That is, the sixth lens 160 may have a shape in which both sides are convex on the optical axis OA. Alternatively, the eleventh surface S11 may have a concave shape on the optical axis OA, and the twelfth surface S12 may have a convex shape on the optical axis OA. That is, the sixth lens 160 may have a meniscus shape that is convex toward the sensor on the optical axis OA. Alternatively, the eleventh surface S11 may have a concave shape on the optical axis OA, and the twelfth surface S12 may have a concave shape on the optical axis OA. That is, the sixth lens 160 may have a concave shape on both sides of the optical axis OA. At least one of the eleventh surface S11 and the twelfth surface S12 may be an aspherical surface. For example, both the eleventh surface S11 and the twelfth surface S12 may be aspherical.

The seventh lens 170 may have positive (+) or negative (−) refractive power on the optical axis OA. The seventh lens 170 may have a refractive power opposite to that of the sixth lens 160 on the optical axis OA. The seventh lens 170 may include plastic or glass. The seventh lens 170 may include a thirteenth surface S13 defined as the object-side surface and a fourteenth surface S14 defined as the sensor-side surface. The thirteenth surface S13 may have a convex shape on the optical axis OA, and the fourteenth surface S14 may have a concave shape on the optical axis OA. That is, the seventh lens 170 may have a meniscus shape that is convex toward the object on the optical axis OA. Alternatively, the thirteenth surface S13 may have a convex shape on the optical axis OA, and the fourteenth surface S14 may have a convex shape on the optical axis OA. That is, the seventh lens 170 may have a shape in which both sides are convex on the optical axis OA. Alternatively, the thirteenth surface S13 may have a concave shape on the optical axis OA, and the fourteenth surface S14 may have a convex shape on the optical axis OA. That is, the seventh lens 170 may have a meniscus shape that is convex toward the sensor on the optical axis OA. Alternatively, the thirteenth surface S13 may have a concave shape on the optical axis OA, and the fourteenth surface S14 may have a concave shape on the optical axis OA. That is, the seventh lens 170 may have a concave shape on both sides of the optical axis OA. At least one of the thirteenth surface S13 and the fourteenth surface S14 may be an aspherical surface. For example, both the thirteenth surface S13 and the fourteenth surface S14 may be aspherical.

In the third lens group G3, the sixth lens 160 closest to the object may have a refractive power opposite to that of the seventh lens 170 closest to the image sensor 300. Additionally, the difference in Abbe numbers between the sixth lens 160 and the seventh lens 170 may be greater than 20. Accordingly, the third lens group G3 may serve as an achromatic while minimizing chromatic aberration changes caused by positions that change according to mode changes.

The eighth lens 180 may have positive (+) refractive power on the optical axis OA. The eighth lens 180 may include plastic or glass. The eighth lens 180 may include a fifteenth surface S15 defined as the object-side surface and a sixteenth surface S16 defined as the sensor-side surface. The fifteenth surface S15 may have a convex shape on the optical axis OA, and the sixteenth surface S16 may have a convex shape on the optical axis OA. That is, the eighth lens 180 may have a shape in which both sides are convex on the optical axis OA. Alternatively, the eighth lens 180 may have a concave shape on the optical axis OA, and the sixteenth surface S16 may have a convex shape on the optical axis OA. That is, the eighth lens 180 may have a meniscus shape convex toward the sensor on the optical axis OA. At least one of the fifteenth surface S15 and the sixteenth surface S16 may be an aspherical surface. For example, both the fifteenth surface S15 and the sixteenth surface S16 may be aspherical.

The fourth lens group G4 may be closest to the image sensor 300 among the plurality of lens groups G1, G2, G3, and G4. In particular, the eighth lens 180, which is closest to the image sensor 300, may have the shortest light movement path among the plurality of lenses 100. The fourth lens group G4 may play a role in controlling the chief ray angle (CRA). In detail, the CRA of the optical system 1000 according to the embodiment may be less than about 10 degrees, and the eighth lens 180 of the fourth lens group G4 may correct the CRA of the light incident on the image sensor 300 to approach 0 degrees.

At least one lens among the plurality of lenses 100 may have a non-circular shape. The non-circular shape lens will be described with reference to FIG. 2.

Referring to FIG. 2, the lens may include an object-side surface and the sensor-side surface, and at least one of the two lens surfaces of the lens may have a non-circular shape. For example, the effective region of the lens surface may include first to fourth edges A1, A2, A3, and A4. The first edge A1 and the second edge A2 may be edges facing each other in a first direction (x-axis direction in FIG. 2) perpendicular to the optical axis OA. The first edge A1 and the second edge A2 may have a curved shape. The first edge A1 and the second edge A2 may be provided in a curved shape with the same length and curvature. That is, the first edge A1 and the second edge A2 may have a symmetrical shape with respect to a virtual line passing through the optical axis OA and extending in the second direction (y-axis direction in FIG. 2).

In the effective region of the lens surface, the third edge A3 and the fourth edge A4 may be edges facing each other in the second direction (y-axis direction in FIG. 2) perpendicular to the optical axis OA and the first direction. The third edge A3 and the fourth edge A4 may be edges connecting the ends of the first edge A1 and the second edge A2. The third edge A3 and the fourth edge A4 may have a straight-line shape. The third edge A3 and the fourth edge A4 may have the same length and be parallel to each other. That is, the third edge A3 and the fourth edge A4 may have a symmetrical shape with respect to a virtual line passing through the optical axis OA and extending in the first direction (x-axis direction in FIG. 2).

The lens surface of the lens may have a non-circular shape, for example, a D-cut shape, as it includes the first to fourth edges A1, A2, A3, and A4 described above. The non-circular shape of the lens surface may be formed during the process of manufacturing the lens. For example, when the lens is made of plastic, it may be manufactured into the non-circular shape described above during the injection process. Alternatively, the lens may be manufactured into a circular shape through an injection process, and in a subsequent cutting process, a partial region of the lens may be cut to have the third and fourth edges A3 and A4.

Accordingly, the effective region of the lens surface may have a set size. For example, the length CA of a virtual first straight line passing through the optical axis OA and connecting the first and second edges A1 and A2 may be longer than the length CH of a virtual second straight line passing through the optical axis OA and connecting the third and fourth edges A1 and A4. Here, the length CA of the first straight line may mean the maximum clear aperture CA of the lens surface, and the length CH of the second straight line may mean the minimum clear aperture CH (clear height) of the lens surface. Additionally, when the effective region of the lens surface has a circular shape rather than a non-circular shape, the maximum clear aperture CA and the minimum clear aperture CH (clear height) of the lens surface may be the same.

At least one lens among the plurality of lenses 100 according to the embodiment may have a non-circular shape. In detail, each of the first lens group G1 and the fourth lens group G4 may include at least one lens of a non-circular shape. For example, the first lens 110 of the first lens group G1 may have a non-circular shape. At least one lens surface of the first surface S1 and the second surface S2 of the first lens 110 may have a non-circular shape. In detail, the effective regions of each of the first surface S1 and the second surface S2 may have a non-circular shape.

The first lens 110 may have a non-circular ratio of less than 1. Here, the non-circular ratio of the first lens 110 may mean a ratio (CH/CA) of the minimum clear aperture CH and the maximum clear aperture CA of the lens surface having a large clear aperture among the object-side surface (first surface S1) and the sensor-side surface (second surface S2) of the first lens 110.

In the first lens 110 according to an embodiment, the first surface S1 may have the clear aperture larger than that of the second surface S2. The non-circular ratio of the first lens 110 may be greater than 0.7. In detail, the non-circular ratio of the first lens 110 may be greater than 0.7 and less than 1. When the non-circular ratio of the first lens 110 is less than 0.7, the height of the first lens 110 may be reduced to have a slim structure, but an area of the effective region lost due to the non-circular shape is increased, so that optical performance may be deteriorated. In addition, when the non-circular ratio of the first lens 110 is 1 or more than 1, it may be difficult to achieve the effect of reducing the height of the first lens 110 because it has a circular shape. Additionally, in the first lens 110, the non-circular ratio of the first surface S1 may be smaller than the non-circular ratio of the second surface S2.

The second lens 120 of the first lens group G1 may have a non-circular shape. At least one lens surface of the third surface S3 and the fourth surface S4 of the second lens 120 may have a non-circular shape. In detail, the effective region of the third surface S3 may have a non-circular shape, and the effective region of the fourth surface S4 may have a circular shape. The non-effective region of the fourth surface S4 may have a non-circular shape.

The second lens 120 may have a non-circular ratio (CH/CA) less than 1. Here, the non-circular ratio of the second lens 120 may mean a ratio (CH/CA) between the minimum clear aperture CH and the maximum clear aperture CA of the lens surface having a large clear aperture among the object-side surface (third surface S3) and the sensor-side surface (fourth surface S4) of the second lens 120.

In the second lens 120 according to an embodiment, the third surface S3 may have a clear aperture larger than the fourth surface S4. The non-circular ratio of the second lens 120 may be greater than 0.7. In detail, the non-circular ratio of the second lens 120 may be greater than 0.7 and less than 1. If the non-circular ratio of the second lens 120 is less than 0.7, the height of the second lens 120 may be reduced to have a slim structure, but the area of the effective region lost due to the non-circular shape increases, thereby reducing the optical Performance may deteriorate. Additionally, when the non-circular ratio of the second lens 120 is 1 or more than 1, it may be difficult to achieve the effect of reducing the height of the second lens 120 because it has a circular shape. Additionally, in the second lens 120, the non-circular ratio of the third surface S3 may be smaller than the non-circular ratio of the fourth surface S4.

The non-circular ratio of the second lens 120 may be different from the non-circular ratio of the first lens 110. In detail, the non-circular ratio of the second lens 120 may be greater than the non-circular ratio of the first lens 110. For example, the non-circular ratio of the second lens 120 may be about 1.05 times or more than the non-circular ratio of the first lens 110. In detail, the non-circular ratio of the second lens 120 may be about 1.1 times or more than the non-circular ratio of the first lens 110 to control light incident on the first lens group G1.

The third lens 130 may have a circular or non-circular shape. In detail, the fifth surface S5 and sixth surface S6 of the third lens 130 may have a circular or non-circular shape. For example, effective regions of each of the fifth surface S5 and the sixth surface S6 may have a circular shape. The third lens 130 may have a non-circular ratio (CH/CA). Here, the non-circular ratio of the third lens 130 may mean a ratio (CH/CA) between the minimum clear aperture CH and the maximum clear aperture CA of the lens surface having a large clear aperture among the object-side surface (fifth surface S5) and the sensor-side surface (sixth surface S6) of the third lens 130. The non-circular ratio of the third lens 130 may be greater than that of the first and second lenses 110 and 120.

In the third lens 130 according to the embodiment, the fifth surface S5 may have a clear aperture larger than that of the sixth surface S6. The non-circular ratio of the third lens 130 may be greater than 0.7. In detail, the non-circular ratio of the third lens 130 may be greater than 0.9 and less than 1.1. In more detail, the third lens 130 is provided as a circular lens with a circular effective region, so the non-circular ratio may be 1. That is, in the third lens 130, the maximum clear aperture CA and the minimum clear aperture CH may be the same in the fifth surface S5 having a large clear aperture. Additionally, in the third lens 130, the non-circular ratio of the sixth surface S6 may be the same as the non-circular ratio of the fifth surface S5. The non-circular ratio of the third lens 130 may be different from the non-circular ratio of the first and second lenses 110 and 120. In detail, the non-circular ratio of the third lens 130 may be greater than the non-circular ratio of the first and second lenses 110 and 120.

The eighth lens 180 of the fourth lens group G4 may have a non-circular shape. At least one lens surface among the fifteenth surface S15 and the sixteenth surface S16 of the eighth lens 180 may have a non-circular shape. In detail, effective regions of each of the fifteenth surface S15 and the sixteenth surface S16 may have a non-circular shape.

The eighth lens 180 may have a non-circular ratio less than 1. Here, the non-circular ratio of the eighth lens 180 may mean a ratio (CH/CA) between the minimum clear aperture CH and the maximum clear aperture CA of the lens surface having a large clear aperture among the object-side surface (fifteenth surface S15) and the sensor-side surface (sixteenth surface S16) of the eighth lens 180. In the eighth lens 180 according to the embodiment, the sixteenth surface S16 may have a clear aperture larger than that of the fifteenth surface S15. The non-circular ratio of the eighth lens 180 may be greater than 0.7. In detail, the non-circular ratio of the eighth lens 180 may be greater than 0.7 and less than 1. When the non-circular ratio of the eighth lens 180 is less than 0.7, the height of the eighth lens 180 may be reduced to have a slim structure, but the area of the effective region lost due to the non-circular shape is increased, so that optical performance may be deteriorated. In addition, when the non-circular ratio of the eighth lens 180 is 1 or more than 1, it may be difficult to achieve the effect of reducing the height of the eighth lens 180 because it has a circular shape. Additionally, in the eighth lens 180, the non-circular ratio of the sixteenth surface S16 may be smaller than the non-circular ratio of the fifteenth surface S15.

The non-circular ratio of at least one lens included in the first lens group G1 may be greater than the non-circular ratio of at least one lens included in the fourth lens group G4. In detail, the eighth lens 180 of the fourth lens group G4 may have a smaller non-circular ratio than the first to third lenses 110, 120, and 130 of the first lens group G1.

In the optical system 1000, the third lens group G3 may include at least one lens of a non-circular shape. For example, the sixth lens 160 of the third lens group G3 may have a non-circular shape. At least one lens surface among the eleventh surface S11 and the twelfth surface S12 of the sixth lens 160 may have a non-circular shape. In detail, effective regions of each of the eleventh surface S11 and the twelfth surface S12 may have a non-circular shape.

The sixth lens 160 may have a non-circular ratio (CH/CA) less than 1. Here, the non-circular ratio of the sixth lens 160 may mean a ratio (CH/CA) between the minimum clear aperture CH and the maximum clear aperture CA of the lens surface having a large clear aperture among the object-side surface (eleventh surface S11) and the sensor-side surface (twelfth surface S12) of the sixth lens 160. In the sixth lens 160 according to the embodiment, the eleventh surface S11 may have a clear aperture larger than that of the twelfth surface S12. The non-circular ratio of the sixth lens 160 may be greater than 0.7. In detail, the non-circular ratio of the sixth lens 160 may be greater than 0.7 and less than 1. When the non-circular ratio of the sixth lens 160 is less than 0.7, the height of the sixth lens 160 may be reduced to have a slim structure, but the area of the effective region lost due to the non-circular shape is increased, so that optical performance may be deteriorated. Additionally, when the non-circular ratio of the sixth lens 160 is 1 or more than 1, it may be difficult to achieve the effect of reducing the height of the sixth lens 160 because it has a circular shape. Additionally, in the sixth lens 160, the non-circular ratio of the eleventh surface S11 may be smaller than the non-circular ratio of the twelfth surface S12.

The seventh lens 170 may have a non-circular shape. At least one lens surface among the thirteenth surface S13 and the fourteenth surface S14 of the seventh lens 170 may have a non-circular shape. In detail, effective regions of each of the thirteenth surface S13 and the fourteenth surface S14 may have a non-circular shape. The seventh lens 170 may have a non-circular ratio (CH/CA) less than 1. Here, the non-circular ratio of the seventh lens 170 may mean a ratio (CH/CA) between the minimum clear aperture CH and the maximum clear aperture CA of the lens surface having a large clear aperture among the object-side surface (thirteenth surface S13) and the sensor-sider surface (fourteenth surface S14) of the seventh lens 170.

In the seventh lens 170 according to the embodiment, the fourteenth surface S14 may have a clear aperture larger than that of the thirteenth surface S13. The non-circular ratio of the seventh lens 170 may be greater than 0.7. The non-circular ratio of the seventh lens 170 may be greater than 0.7 and less than 1. When the non-circular ratio of the seventh lens 170 is less than 0.7, the height of the seventh lens 170 may be reduced to have a slim structure, but the area of the effective region lost due to the non-circular shape is increased, so that optical performance may be deteriorated. When the non-circular ratio of the seventh lens 170 is 1 or more than 1, it may be difficult to achieve the effect of reducing the height of the seventh lens 170 because it has a circular shape. Additionally, in the seventh lens 170, the non-circular ratio of the thirteenth surface S13 may be greater than the non-circular ratio of the fourteenth surface S14. The non-circular ratio of the seventh lens 170 may be different from the non-circular ratio of the sixth lens 160. In detail, the non-circular ratio of the sixth lens 160 may be greater than the non-circular ratio of the seventh lens 170. For example, the non-circular ratio of the sixth lens 160 may be about 1.05 times or more than the non-circular ratio of the seventh lens 170. In detail, the non-circular ratio of the sixth lens 160 may be about 1.1 times or more than the non-circular ratio of the seventh lens 170 to effectively correct chromatic aberration.

The sixth and seventh lenses 160 and 170 included in the third lens group G3 may have similar minimum clear apertures CH. In detail, the minimum clear apertures CH of the sixth and seventh lenses 160 and 170 may have sizes that correspond to each other within a range of about 5% or less, and the difference in the minimum clear apertures CH may be about 0.03 mm or less. The minimum clear apertures CH of the sixth and seventh lenses 160 and 170 included in the third lens group G3 may be smaller than the minimum clear apertures CH of the lenses 110, 120, 130, and 180 included in the first lens group G1 and the fourth lens group G4. In detail, the maximum value of the minimum clear apertures CH of the sixth and seventh lenses 160 and 170 may be smaller than the largest value among the minimum clear apertures CH of the lenses 110, 120, 130, and 180 included in the first lens group G1 and the fourth lens group G4. The maximum value of the minimum clear aperture CH of the third lens group G3 may be about 70% to about 80% of the largest value of the minimum clear apertures CH of the lenses 110, 120, 130, and 180 included in the first lens group G1 and the fourth lens group G4.

When the maximum value of the minimum clear aperture CH of the third lens group G3 does not satisfy the above-mentioned range, it may be difficult to structurally secure a space for the third lens group G3 to be placed between the first lens group G1 and the fourth lens group G4. Additionally, it may be difficult for the third lens group G3 to secure a moving distance between the first lens group G1 and the fourth lens group G4 according to the operation mode.

In the optical system 1000, the second lens group G2 may include a circular-shaped lens. The second lens group G2 may not include lenses of a non-circular shape.

The fourth lens 140 may have a circular shape. In detail, the seventh surface S7 and the eighth surface S8 of the fourth lens 140 may have a circular shape. For example, the effective regions of each of the seventh surface S7 and the eighth surface S8 of the fourth lens 140 may have a circular shape. The fourth lens 140 may have a non-circular ratio (CH/CA). Here, the non-circular ratio of the fourth lens 140 may mean a ratio (CH/CA) of the minimum clear aperture CH and the maximum clear aperture CA of the lens surface having a large clear aperture of the object-side surface (seventh surface S7) and the sensor-sider surface (eighth surface S8) of the fourth lens 140.

In the fourth lens 140 according to the embodiment, the seventh surface S7 may have a clear aperture larger than the eighth surface S8. The non-circular ratio of the fourth lens 140 may be greater than 0.9 and less than 1.1. In detail, the fourth lens 140 is provided as a circular lens with a circular effective region, so the non-circular ratio may be 1. That is, in the fourth lens 140, the seventh surface S7, which has a large clear aperture, may have the same maximum clear aperture CA and minimum clear aperture CH. Additionally, in the fourth lens 140, the eighth surface S8 has a circular effective region and may have a non-circular ratio equal to that of the seventh surface S7.

The fifth lens 150 may have a circular shape. In detail, the ninth surface S9 and the tenth surface S10 of the fifth lens 150 may have a circular shape. For example, the effective regions of each of the ninth surface S9 and the tenth surface S10 of the fifth lens 150 may have a circular shape. The fifth lens 150 may have a non-circular ratio (CH/CA). Here, the non-circular ratio of the fifth lens 150 may mean a ratio (CH/CA) of the minimum clear aperture CH and the maximum clear aperture CA of the lens surface having a large clear aperture among the object-side surface (ninth surface S9) and the sensor-sider surface (tenth surface S10) of the fifth lens 150.

In the fifth lens 150 according to the embodiment, the ninth surface S9 may have a clear aperture larger than the tenth surface S10. The non-circular ratio of the fifth lens 150 may be greater than 0.7. In detail, the non-circular ratio of the fifth lens 150 may be greater than 0.9 and less than 1.1. In more detail, the fifth lens 150 is provided as a circular lens with a circular effective region, so the non-circular ratio may be 1. That is, in the fifth lens 150, the ninth surface S9, which has a large clear aperture, may have the same maximum clear aperture CA and minimum clear aperture CH. Additionally, in the fifth lens 150, the tenth surface S10 has a circular effective region and may have a non-circular ratio equal to that of the seventh surface S7.

The minimum clear aperture CH of the fourth and fifth lenses 140 and 150 included in the second lens group G2 may be smaller than the minimum clear aperture CH of the lenses 110, 120, 130, and 180 included in the first lens group G1 and the fourth lens group G4. In detail, the maximum value of the minimum clear apertures CH of the fourth and fifth lenses 140 and 150 may be smaller than the largest value among the minimum clear apertures CH of the lenses 110, 120, 130, and 180 included in the first lens group G1 and the fourth lens group G4. The maximum value of the minimum clear aperture CH of the second lens group G2 may be about 70% to about 80% of the largest value of the minimum clear apertures CH of the lens 110, 120, 130, and 180 included in the first lens group G1 and the fourth lens group G4.

The maximum value of the minimum clear aperture CH of the fourth and fifth lenses 140 and 150 may be similar to the maximum value of the minimum clear aperture CH of the lenses 160 and 170 included in the third lens group G3. For example, the maximum value of the minimum clear aperture CH of the lenses 140 and 150 included in the second lens group G2 may have a size corresponding to the maximum value of the minimum clear apertures CH of the lenses 160 and 170 included in the third lens group G3 within a range of about 5% or less, and the difference between those values may be about 0.03 mm or less.

When the maximum value of the minimum clear aperture CH of the second lens group G2 does not satisfy the above-mentioned range, it may be difficult to structurally secure a space for the second lens group G2 to be placed between the first lens group G1 and the fourth lens group G4. Additionally, it may be difficult for the second lens group G2 to secure a moving distance depending on the operation mode between the first lens group G1 and the fourth lens group G4.

In the first and fourth lens groups G1 and G4 disposed at fixed positions even when the operation mode is changed, the specific circularity CH/CA of the eighth lens 180 may be the smallest among the lenses 110, 120, 130, and 180 included in the first and fourth lens groups G1 and G4. Additionally, the non-circular ratio (CH/CA) of the third lens 130 may be the largest among the lenses 110, 120, 130, and 180 included in the first and fourth lens groups G1 and G4. In the second and third lens groups G2 and G3 whose positions change depending on the operation mode, the non-circular ratio (CH/CA) of the seventh lens 170 may be the smallest among the lenses 140, 150, 160, and 170 included in the second and third lens groups G2 and G3. In addition, the non-circular ratio (CH/CA) of the fourth lens 140 and the fifth lens 150 may be the largest among the lenses 140, 150, 160, and 170 included in the lens groups G2 and G3.

Accordingly, the optical system 1000 according to the embodiment may have improved assembly properties and a mechanically stable form. Additionally, the optical system 1000 may significantly reduce the moving distance of the moving lens group and provide various magnifications. As the effective regions of the lenses 140 and 150 included in the second lens group G2 have a circular shape, the diffraction effect occurring in lenses whose effective regions have a non-circular shape may be minimized.

A camera module (not shown) according to an embodiment may include the optical system 1000 described above. The camera module may move at least one lens group among the plurality of lens groups G1, G2, G3, and G4 included in the optical system 1000 in the direction of the optical axis OA. The camera module may include a driving member (not shown) connected to the optical system 1000. The driving member may move at least one lens group in the optical axis OA direction according to the operation mode.

The operation mode may include a first mode operating at a first magnification and a second mode operating at a second magnification different from the first magnification. At this time, the second magnification may be greater than the first magnification. Additionally, the operation mode may include a third mode operating at a third magnification that is between the first and second magnifications. Here, the first magnification may be the lowest magnification of the optical system 1000, and the second magnification may be the highest magnification of the optical system 1000. The first magnification may be about 3 to about 5 times, the second magnification may be about 8 to 11 times, and the third magnification may be about 5 to 8 magnifications by a magnification between the two magnifications.

The driving member may move at least one lens group according to one operation mode selected from the first to third modes. In detail, the driving member is connected to the second lens group G2 and the third lens group G3, and may move the second lens group G2 and the third lens group G3 according to the operation mode.

For example, in the first mode, each of the second lens group G2 and the third lens group G3 may be located at a location defined as the first position. Additionally, in the second mode, each of the second lens group G2 and the third lens group G3 may be located at a location defined as a second position different from the first position. Additionally, in the third mode, each of the second lens group G2 and the third lens group G3 may be located at a location defined as a third position that is different from the first and second positions. The third position may be a region between the first and second positions. For example, the third position where the second lens group G2 may be located in the third mode may be a region between the first and second positions where the second lens group G2 is located in the first and second modes. In addition, the third position where the third lens group G3 is located in the third mode is an area between the first and second positions where the third lens group G3 is located in the first and second modes. It may be.

In the optical system 1000 according to the embodiment, the second lens group G2 and the third lens group G3 may move depending on the operation mode, and the first lens group G1 and the fourth lens group G4 may be disposed in a fixed position. The first to fourth lens groups G1, G2, G3, and G4 may have a set distance from adjacent lens groups in each of the first, second, and third positions according to the operation mode. Accordingly, the optical system 1000 may have a constant TTL (Total track length) even when the operation mode changes, and the effective focal length and magnification of the optical system 1000 may be controlled by controlling the positions of some lens groups.

The optical system 1000 according to the embodiment may satisfy at least one of the equations described below. Accordingly, the optical system 1000 according to the embodiment may effectively correct aberrations that change depending on the operation mode change. Additionally, the optical system 1000 according to the embodiment may effectively provide an autofocus (AF) function for subjects at various magnifications and may have a slim and compact structure.

$$n\_G1, n\_G2, n\_G3 > \qquad \text{[Equation 1]}$$

$$1(n\_G1, n\_G2, n\_G3 \text{ are natural numbers})$$

In Equation 1, n_G1, n_G2, and n_G3 mean the number of lenses included in each of the first to third lens groups G1, G2, and G3.

$$0.7 < CH\_G1max/CA\_G1max < 1 \qquad \text{[Equation 2]}$$

In Equation 2, CA_G1max means the maximum clear aperture CA of the lens surface of the lens with the largest clear aperture among the lenses included in the first lens group G1, and CH_G1max means the minimum clear aperture CH of the lens surface of the lens with the largest clear aperture.

$$0.7 < CH\_G4max/CA\_G4max < 1 \qquad \text{[Equation 3]}$$

In Equation 3, CA_G4max means the maximum clear aperture CA of the lens surface of the lens with the largest clear aperture among the lenses included in the fourth lens group G4, and CH_G4max means the minimum clear aperture CH of the lens surface of the lens with the largest clear aperture.

$$0.7 < CH\_G3max/CA\_G3max < 1 \qquad \text{[Equation 4]}$$

In Equation 4, CA_G3max means the maximum clear aperture CA of the lens surface of the lens with the largest clear aperture among the lenses included in the third lens group G3, and CH_G3max means the minimum clear aperture CH of the lens surface of the lens with the largest clear aperture.

$$CH\_G4max/CA\_G4max < CH\_G1max/CA\_G1max \qquad \text{[Equation 5]}$$

In Equation 5, CH_Gnmax means the minimum clear aperture CH of the lens surface of the lens with the largest clear aperture among the lenses included in the n-th lens group, and CA_Gnmax means the maximum clear aperture CA of the lens surface of the lens with the largest clear aperture among the lenses included in the n-th lens group.

$$0.7 < \qquad \text{[Equation 6]}$$
$$(CH\_G1max/CA\_G1max)/(CH\_G1min/CA\_G1min) < 1$$

In Equation 6, CA_G1max means the maximum clear aperture CA of the lens surface of the lens with the largest clear aperture among the lenses included in the first lens group G1, and CH_G1max means the minimum clear aperture CH of the lens surface of the lens with the largest clear aperture. CA_G1 min means the maximum clear aperture CA of the lens surface of the lens with the smallest clear aperture among the lenses included in the first lens group G1, and CH_G1 min means the minimum clear aperture CH of the lens surface of the lens with the smallest clear aperture.

$$CH\_G2max/CA\_G2max = CH\_G2min/CA\_G2min \qquad \text{[Equation 7]}$$

In Equation 7, CA_G2max means the maximum clear aperture CA of the lens surface of the lens with the largest clear aperture among the lenses included in the second lens group G2, and CH_G2max means the maximum clear aperture CH of the lens surface of the lens with the largest clear aperture. CA_G2 min means the maximum clear aperture CA of the lens surface of the lens with the smallest clear aperture among the lenses included in the second lens group G2, and CH_G2 min means the minimum clear aperture CH of the lens surface of the lens with the smallest clear aperture.

$$0.9 < CH\_G1max/CH\_G4max < 1.1 \qquad \text{[Equation 8]}$$

In Equation 8, CH_G1max means the minimum clear aperture CH of the lens surface of the lens with the largest clear aperture among the lenses included in the first lens group G1, and CH_G4max means the minimum clear aperture CH of the lens surface of the lens with the largest clear aperture among the lenses included in the first lens group G1, and CH_G4max means the minimum clear aperture CH of the lens surface of the lens with the largest clear aperture among the lenses included in the fourth lens group G4.

$$1 < CH\_G1max/CH\_G2max < 2 \qquad \text{[Equation 9]}$$

In Equation 9, CH_G1max means the minimum clear aperture CH of the lens surface of the lens with the largest clear aperture among the lenses included in the first lens group G1, and CH_G2max means the minimum clear aperture CH of the lens surface of the lens with the largest clear aperture among the lenses included in the second lens group G2.

$$1 < CH\_G4max/CH\_G3max < 2 \qquad \text{[Equation 10]}$$

In Equation 10, CH_G3max means the minimum clear aperture CH of the lens surface of the lens with the largest clear aperture among the lenses included in the third lens group G3, and CH_G4max means the minimum clear aperture CH of the lens surface of the lens with the largest clear aperture among the lenses included in the fourth lens group G4.

$$0.9 < CH\_G2max/CH\_G3max < 1.1 \qquad \text{[Equation 11]}$$

In Equation 11, CH_G2max means the minimum clear aperture CH of the lens surface of the lens with the largest clear aperture among the lenses included in the second lens group G2, and CH_G3max means the minimum clear aperture CH of the lens surface of the lens with the largest clear aperture among the lenses included in the third lens group G3.

$$CH\_G4max/CH\_G1max < CA\_G4max/CA\_G1max \qquad \text{[Equation 12]}$$

In Equation 12, CH_Gnmax means the minimum clear aperture CH of the lens surface of the lens with the largest clear aperture among the lenses included in the n-th lens group, and CA_Gnmax means the maximum clear aperture CA of the lens surface of the lens with the largest clear aperture among the lenses included in the n-th lens group.

When the optical system 1000 according to an embodiment satisfies at least one or two of Equations 1 to 12, the optical system 1000 may have a slim structure. In detail, the optical system 1000 may be provided slim by reducing the height while minimizing the area of the effective region lost due to the non-circular shape. The optical system 1000 inhibits optical performance from being degraded due to a reduction in the area of the effective region caused by a non-circular lens, controls aberration characteristics, and minimizes the diffraction effect occurring in the non-circular lens. Additionally, the optical system 1000 has improved assembly properties and may have a mechanically stable form.

$$1 < L\_G1/L\_G2 < 3 \qquad \text{[Equation 13]}$$

In Equation 13, L_G1 means a distance in the optical axis OA between the object-side surface of the lens closest to the object and the sensor-side surface of the lens closest to the image sensor 300 among the lenses included in the first lens group G1. For example, L_G1 means the distance in the optical axis OA between the first surface S1 of the first lens 110 and the sixth surface S6 of the third lens 130. L_G2 means a distance in the optical axis OA between the object-side surface of the lens closest to the object and the sensor-side surface of the lens closest to the image sensor 300 among the lenses included in the second lens group G2. For example, L_G2 means the distance in the optical axis OA between the seventh surface S7 of the fourth lens 140 and the tenth surface S10 of the fifth lens 150.

$$1 < L\_G1/L\_G3 < 3 \qquad \text{[Equation 14]}$$

In Equation 14, L_G1 means a distance in the optical axis OA between the object-side surface of the lens closest to the object and the sensor-side surface of the lens closest to the image sensor 300 among the lenses included in the first lens group G1. For example, L_G1 means the distance in the optical axis OA between the first surface S1 of the first lens 110 and the sixth surface S6 of the third lens 130. L_G3 means the distance in the optical axis OA between the object-side surface of the lens closest to the object and the sensor-side surface of the lens closest to the image sensor 300 among the lenses included in the third lens group G3. For example, L_G3 means the distance in the optical axis OA between the eleventh surface S11 of the sixth lens 160 and the fourteenth surface S14 of the seventh lens 170.

When the optical system 1000 according to the embodiment satisfies at least one of Equation 13 and Equation 14, it has a relatively small TTL and may provide various magnifications according to mode changes.

$$0.05 < L\_G1/TTL < 0.5 \qquad \text{[Equation 15]}$$

In Equation 15, L_G1 means a distance in the optical axis OA between the object-side surface of the lens closest to the object and the sensor-side surface of the lens closest to the image sensor 300 among the lenses included in the first lens group G1. For example, L_G1 means the distance in the optical axis OA between the first surface S1 of the first lens 110 and the sixth surface S6 of the third lens 130. Total track length (TTL) means the distance (mm) in the optical axis OA from the object-side surface (first surface S1) of the first lens 110 to an image surface of the image sensor 300. When the optical system 1000 according to the embodiment satisfies Equation 15, the optical system 1000 has a relatively small TTL and may have improved optical characteristics by controlling stray light incident on the first lens group G1.

$$0.05 < L\_G2/TTL < 0.5 \qquad \text{[Equation 16]}$$

In Equation 16, L_G2 means a distance in the optical axis OA between the object-side surface of the lens closest to the object and the sensor-side surface of the lens closest to the image sensor 300 among the lenses included in the second lens group G2. For example, L_G2 means the distance in the optical axis OA between the seventh surface S7 of the fourth lens 140 and the tenth surface S10 of the fifth lens 150. When the optical system 1000 according to the embodiment satisfies Equation 16, the optical system 1000 has a relatively small TTL, may minimize the diffraction effect occurring in a non-circular lens, and may improve chromatic aberration characteristics.

$$20 < |vd4 - vd5| \qquad \text{[Equation 17]}$$

In Equation 17, vd4 means Abbe number of the fourth lens 140, and vd5 means Abbe number of the fifth lens 150. When the optical system 1000 according to the embodiment satisfies Equation 17, the optical system 1000 may improve chromatic aberration characteristics.

$$20 < |vd6 - vd7| \qquad \text{[Equation 18]}$$

In Equation 18, vd6 means the Abbe number of the sixth lens, and vd7 means the Abbe number of the seventh lens. When the optical system 1000 according to the embodiment satisfies Equation 18, the optical system 1000 may improve chromatic aberration characteristics.

$$1.6 < n3d \qquad \text{[Equation 19]}$$

In Equation 19, n3d means the refractive index of the third lens 130. If the optical system 1000 according to the embodiment satisfies Equation 19, the effective region of the lens disposed after the third lens 130 may be secured and the height of the lens may be reduced.

$$1 < L1R1/L3R2 < 2 \qquad \text{[Equation 20]}$$

In Equation 20, L1R1 means the radius of curvature of the object-side surface (first surface S1) of the first lens 110, and L3R2 means the radius of curvature of the sensor-side surface (sixth surface S6) of the third lens 130. When the optical system 1000 according to the embodiment satisfies Equation 20, the optical system 1000 may control stray light incident on the first lens group G1.

$$1 < L1R1/L4R1 < 2 \qquad \text{[Equation 21]}$$

In Equation 21, L1R1 means the radius of curvature of the object-side surface (first surface S1) of the first lens 110, and L4R1 means the radius of curvature of the object-side surface (seventh surface S7) of the fourth lens 140. When the optical system 1000 according to the embodiment satisfies Equation 21, the optical system 1000 may have good optical performance at various magnifications.

$$1 < L3R2/L4R1 < 2 \qquad \text{[Equation 22]}$$

In Equation 22, L3R2 means the radius of curvature of the sensor-side surface (sixth surface S6) of the third lens 130, and L4R1 means a radius of curvature of the object-side surface (seventh surface S7) of the fourth lens 140. When the optical system 1000 according to the embodiment satisfies Equation 22, the optical system 1000 may have good optical performance in the peripheral region of the FOV when operating at various magnifications.

$$-1.5 < L1R1/L8R2 < 0 \qquad \text{[Equation 23]}$$

In Equation 23, L1R1 means the radius of curvature of the object-side surface (first surface S1) of the first lens 110, and L8R2 means a radius of curvature of the sensor-side surface (sixteenth surface S16) of the eighth lens 180. When the optical system 1000 according to the embodiment satisfies Equation 23, the optical system 1000 may have good optical performance in the center and peripheral regions of the FOV.

$$0.05 < m\_G2/TTL < 0.5 \qquad \text{[Equation 24]}$$

In Equation 24, m_G2 means a moving distance of the second lens group G2 when changing from the first mode operating at a first magnification to the second mode operating at a second magnification, or from the second mode to the first mode. In detail, m_G2 means a value of a difference between an interval in the optical axis OA between the first and second lens groups G1 and G2 in the first mode and an interval in the optical axis OA between the first and second lens groups G1 and G2 in the second mode. When the optical system 1000 according to the embodiment satisfies Equation 24, the optical system 1000 may minimize the moving distance of the second lens group G2 when changing magnification, so that the optical system 1000 may have a slim structure. Additionally, the moving distance may be minimized when controlling the position of the second lens group G2, resulting in improved power consumption characteristics.

$$0.05 < m\_G3/TTL < 0.5 \qquad \text{[Equation 25]}$$

In Equation 25, m_G3 means a moving distance of the third lens group G3 when the first mode operates at a first magnification to the second mode operated at a second magnification, or when the second mode is changed to the first mode. Specifically, m_G3 means a value of a difference between an interval in the optical axis OA between the third and fourth lens groups G3 and G4 in the first mode and an interval in the optical axis OA between the third and fourth lens groups G3 and G4 in the second mode. When the optical system 1000 according to the embodiment satisfies Equation 25, the optical system 1000 may minimize the moving distance of the third lens group G3 when changing magnification, so that the optical system 1000 may have a slim structure. Additionally, the moving distance may be minimized when controlling the position of the third lens group G3, resulting in improved power consumption characteristics.

$$1.5 < m\_G2/L\_G2 < 2.5 \qquad \text{[Equation 26]}$$

In Equation 26, m_G2 means a moving distance of the second lens group G2 when changing from the first mode operating at a first magnification to the second mode operating at a second magnification, or from the second mode to the first mode. In detail, m_G2 means a value of a difference between an interval in the optical axis OA between the first and second lens groups G1 and G2 in the first mode and an interval in the optical axis OA between the first and second lens groups G1 and G2 in the second mode. L_G2 means a distance in the optical axis OA between the object-side surface of the lens closest to the object and the sensor-side surface of the lens closest to the image sensor 300 among the lenses included in the second lens group G2. For example, L_G2 means the distance in the optical axis OA between the seventh surface S7 of the fourth lens 140 and the tenth surface S10 of the fifth lens 150.

When the optical system 1000 according to the embodiment satisfies Equation 26, the optical system 1000 may minimize the moving distance of the second lens group G2 when changing magnification, so that the optical system 1000 may have a slim structure. Additionally, the moving distance may be minimized when controlling the position of the second lens group G2, resulting in improved power consumption characteristics.

$$2 < m\_G3/L\_G3 < 3.5 \qquad \text{[Equation 27]}$$

In Equation 27, m_G3 means a moving distance of the third lens group G3 when the first mode operates at a first magnification to the second mode operated at a second magnification, or when the second mode is changed to the first mode. Specifically, m_G3 means a value of a difference between an interval in the optical axis OA between the third and fourth lens groups G3 and G4 in the first mode and an interval in the optical axis OA between the third and fourth lens groups G3 and G4 in the second mode. L_G3 means the distance in the optical axis OA between the object-side surface of the lens closest to the object and the sensor-side surface of the lens closest to the image sensor 300 among the lenses included in the third lens group G3. For example, L_G3 means the distance in the optical axis OA between the eleventh surface S11 of the sixth lens 160 and the fourteenth surface S14 of the seventh lens 170.

When the optical system 1000 according to the embodiment satisfies Equation 27, the optical system 1000 may minimize the moving distance of the third lens group G3 when changing magnification, so that the optical system 1000 may have a slim structure. Additionally, the moving distance may be minimized when controlling the position of the third lens group G3, resulting in improved power consumption characteristics.

$$4 < d\_G12\_mode1/d\_G34\_mode1 < 12 \qquad \text{[Equation 28]}$$

In Equation 28, d_G12_mode1 means a distance between the first lens group G1 and the second lens group G2 in the first mode in which the second lens group G2 and the third lens group G3 are disposed at the first position. That is, d_G12_mode1 means the distance in the optical axis OA between the third lens 130 and the fourth lens 140 in the first mode. d_G34_mode1 means a distance between the third lens group G3 and the fourth lens group G4 in the first mode in which the second lens group G2 and the third lens group G3 are disposed at the first position. That is, d_G34_mode1 means the distance in the optical axis OA between the seventh lens 170 and the eighth lens 180 in the first mode. When the optical system 1000 according to the embodiment satisfies Equation 28, the optical system 1000 may have improved optical characteristics at the first magnification. In detail, the optical system 1000 may have improved aberration characteristics at the first magnification, and may improve optical performance in the center and periphery regions of the FOV.

$$0.01 < d\_G12\_mode2/d\_G34\_mode2 < 0.5 \qquad \text{[Equation 29]}$$

In Equation 29, d_G12_mode2 means a distance between the first lens group G1 and the second lens group G2 in the second mode in which the second lens group G2 and the third lens group G3 are disposed at the second position. That is, d_G12_mode2 means the distance in the optical axis OA between the third lens 130 and the fourth lens 140 in the second mode. d_G34_mode2 means a distance between the third lens group G3 and the fourth lens group G4 in the second mode in which the second lens group G2 and the third lens group G3 are disposed at the second position. That is, d_G34_mode2 means the distance in the optical axis OA between the seventh lens 170 and the eighth lens 180 in the second mode. When the optical system 1000 according to the embodiment satisfies Equation 29, the optical system 1000 may have improved optical characteristics at the second magnification. In detail, the optical system 1000 has improved aberration characteristics at the second magnification and may improve optical performance in the peripheral region of the FOV.

$$0.1 < EFL\_1/EFL\_2 < 1 \qquad \text{[Equation 30]}$$

In Equation 30, EFL_1 is the first effective focal length, and is the effective focal length of the optical system 1000 during the first mode operation in which the second lens group G2 and the third lens group G3 are located at the first position. EFL_2 is the second effective focal length, and is the effective focal length of the optical system 1000 during the operation of the second mode in which the second lens group G2 and the third lens group G3 are located at the second position.

$$2 < EFL\_1/EPD\_1 < 3 \qquad \text{[Equation 31]}$$

In Equation 31, EFL_1 is the first effective focal length, and is the effective focal length of the optical system 1000 during the first mode operation in which the second lens group G2 and the third lens group G3 are located at the first position. EPD_1 means the entrance pupil diameter (EPD) of the optical system 1000 during operation in the first mode in which the second lens group G2 and the third lens group G3 are located in the first position. When the optical system 1000 according to the embodiment satisfies Equation 31, the optical system 1000 may secure a bright image when operating in the first mode.

$$4.5 < EFL\_2/EPD\_2 < 6 \qquad \text{[Equation 32]}$$

In Equation 32, EFL_2 is the second effective focal length, and is the effective focal length of the optical system 1000 during the operation of the second mode in which the second lens group G2 and the third lens group G3 are located at the second position. EPD_2 means the entrance pupil diameter of the optical system 1000 when operating in the second mode in which the second lens group G2 and the third lens group G3 are located in the second position. When the optical system 1000 according to the embodiment satisfies Equation 32, the optical system 1000 may secure a bright image when operating in the second mode.

$$F\#\_Mode1 < 3.5 \qquad \text{[Equation 33]}$$
$$F\#\_Mode2 < 6.0$$

In Equation 33, F #_mode1 means F-number of the optical system 1000 when operating in the first mode in which the second lens group G2 and the third lens group G3 are located at the first position, and F #_mode2 means the F-number of the optical system 1000 during the second mode operation in which the second lens group G2 and the third lens group G3 are located at the second position.

$$1 < TTL/EFL\_1 < 3 \qquad \text{[Equation 34]}$$

In Equation 34, EFL_1 is the first effective focal length, and is the effective focal length of the optical system 1000 during the first mode operation in which the second lens group G2 and the third lens group G3 are located at the first position. In Equation 34, the relationship between TTL and EFL_1 may be established.

$$0.1 < TTL/EFL\_2 < 1 \qquad \text{[Equation 35]}$$

In Equation 35, EFL_2 is the second effective focal length, and is the effective focal length of the optical system 1000 during the operation of the second mode in which the second lens group G2 and the third lens group G3 are located at the second position. In Equation 35, the relationship between TTL and EFL 2 may be established.

US 12,631,856 B2

29    30

$$1 < CA\_Smax/ImgH < 4 \qquad \text{[Equation 36]}$$

In Equation 36, CA_Smax means the largest clear aperture CA among the lens surfaces of the plurality of lenses 100 included in the optical system 1000. ImgH is a distance from 0 field, which is the center of the image surface of the image sensor 300 overlapping the optical axis OA, to 1.0 field of the image sensor 300, and the distance is a vertical distance from the optical axis OA. That is, ImgH means ½ of the total diagonal length of the effective region of the image sensor 300. When the optical system 1000 according to the embodiment satisfies Equation 36, the optical system 1000 may be provided in a slim and compact manner. Additionally, the optical system 1000 may implement high resolution and high image quality.

$$5 < TTL/ImgH < 10 \qquad \text{[Equation 37]}$$

In Equation 37, TTL means the distance (mm) in the optical axis OA from the object-side surface (first surface S1) of the first lens 110 to the image surface of the image sensor 300. ImgH is a distance from 0 field, which is the center of the image surface of the image sensor 300 overlapping the optical axis OA, to 1.0 field of the image sensor 300, and the distance is a vertical distance from the optical axis OA. That is, ImgH means ½ of the total diagonal length of the effective region of the image sensor 300. When the optical system 1000 according to the embodiment satisfies Equation 37, the optical system 1000 may have a smaller TTL, so the optical system 1000 may be provided in a slim and compact manner.

$$15 < TTL/BFL < 30 \qquad \text{[Equation 38]}$$

In Equation 38, TTL means the distance (mm) in the optical axis (OA) from the object-side surface (first surface S1) of the first lens 110 to the image surface of the image sensor 300. BFL (Back focal length) means a distance in the optical axis OA from the vertex of the sensor-side surface of the lens closest to the image sensor 300 to the image surface of the image sensor 300.

$$2 < ImgH/BFL < 4 \qquad \text{[Equation 39]}$$

In Equation 38, ImgH is a distance from 0 field, which is the center of the image surface of the image sensor 300 overlapping the optical axis OA, to 1.0 field of the image sensor 300, and the distance is a vertical distance from the optical axis OA. That is, ImgH means ½ of the total diagonal length of the effective region of the image sensor 300. That is, the ImgH means ½ of the total diagonal length of the effective region of the image sensor 300. BFL means the distance in the optical axis OA from the vertex of the sensor-side surface of the lens closest to the image sensor 300 to the image surface of the image sensor 300. When the optical system 1000 according to the embodiment satisfies Equation 39, it is possible to secure the BFL required for the image sensor 300 of a relatively large size, for example, a large image sensor of around 1 inch. Additionally, when the optical system 1000 satisfies Equation 39, the optical system 1000 may operate at various magnifications while maintaining TTL, and may have excellent optical characteristics in the center and periphery regions of the FOV.

$$Z = \frac{cY^2}{1 + \sqrt{1 - (1+K)c^2Y^2}} + AY^4 + BY^6 + CY^8 + DY^{10} + \\ EY^{12} + FY^{14} + ... \qquad \text{[Equation 40]}$$

In Equation 40, Z is Sag, which may mean a distance in a direction of the optical axis from an arbitrary position on the aspherical surface to the vertex of the aspherical surface. In addition, Y may mean a distance in a direction perpendicular to the optical axis from any position on the aspherical surface to the optical axis. Also, c may mean a curvature of the lens, and K may mean a conic constant. In addition, A, B, C, D, E, and F may mean an aspheric constant.

The optical system 1000 according to the embodiment may satisfy at least one of Equations 1 to 39 described above. Accordingly, the optical system 1000 and the camera module may have improved optical properties. In detail, as the optical system 1000 satisfies at least one or two or more of Equations 1 to 39, it is possible to effectively correct deterioration of optical properties such as chromatic aberration, vignetting, diffraction effect, and peripheral image quality deterioration caused by movement of the lens group. In addition, the optical system 1000 according to the embodiment may significantly reduce the moving distance of the lens group and provide an autofocus (AF) function for various magnifications with excellent power consumption characteristics.

As the optical system 1000 according to the embodiment satisfies at least one or two of Equations 1 to 39, it has improved assembly properties, may have a mechanically stable shape, and may be provided in a slim structure, so that the optical system 1000 and the camera module including the same may have a compact structure.

Hereinafter, the optical system 1000 and first to third mode changes according to the embodiment will be described in more detail.

In the optical system 1000 according to the embodiment, the first lens group G1 and the fourth lens group G4 may be fixed and the second lens group G2 and the third lens group G3 may be provided to be movable. The first lens group G1 may include three lenses, for example, the first to third lenses 110, 120, and 130, and the second lens group G2 may include two lenses, for example, the fourth and fifth lenses 140 and 150. In addition, the third lens group G3 may include two lenses, for example, the sixth and seventh lenses 160 and 170, and the fourth lens group G4 may include one lens, for example, the eighth lens 180. In the optical system 1000 according to the embodiment, the object-side surface (seventh surface S7) of the fourth lens 140 may serve as an aperture stop, and the above-described filter 500 may be disposed between the fourth lens group G4 and the image sensor 300.

TABLE 1

| Lens | Surface | Radius of curvature (mm) | Thickness (mm)/ Distance (mm) | Reflective Index | Abbe number | Focal length (mm) |
|------|---------|------|------|------|------|------|
| Lens 1 | S1 | 4.844 | 1.325 | 1.671 | 19.24 | 11.320 |

TABLE 1-continued

| Lens | Surface | Radius of curvature (mm) | Thickness (mm)/ Distance (mm) | Reflective Index | Abbe number | Focal length (mm) |
|------|---------|--------------------------|-------------------------------|------------------|-------------|-------------------|
| | S2 | 11.634 | 0.100 | | | |
| Lens 2 | S3 | 6.015 | 1.129 | 1.535 | 55.71 | 14.050 |
| | S4 | 27.687 | 0.690 | | | |
| Lens 3 | S5 | −29.006 | 0.600 | 2.002 | 19.32 | −3.347 |
| | S6 | 3.884 | d_G12 | | | |
| Lens 4 | S7 | 3.132 | 1.339 | 1.535 | 55.71 | 4.980 |
| | S8 | −15.567 | 0.100 | | | |
| Lens 5 | S9 | 11.182 | 0.600 | 1.671 | 19.24 | −13.172 |
| | S10 | 4.863 | d_G23 | | | |
| Lens 6 | S11 | −4.582 | 1.216 | 1.671 | 19.24 | 8.716 |
| | S12 | −2.861 | 0.341 | | | |
| Lens 7 | S13 | −5.150 | 0.600 | 1.497 | 81.52 | −4.082 |
| | S14 | 3.493 | d_G34 | | | |
| Lens 8 | S15 | 27.497 | 1.587 | 1.671 | 19.24 | 8.052 |
| | S16 | −6.671 | 0.500 | | | |
| Filter | S17 | infinity | 0.210 | | | |
| | S18 | infinity | 0.289 | | | |
| Image sensor | | infinity | 0.001 | | | |

TABLE 2

| Lens | Surface | Maximum clear aperture CA (mm) | Minimum clear aperture CH (mm) |
|------|---------|-------------------------------|-------------------------------|
| Lens 1 | S1 | 6.000 | 4.902 |
| | S2 | 5.625 | 4.902 |
| Lens 2 | S3 | 5.321 | 4.901 |
| | S4 | 4.777 | 4.777 |
| Lens 3 | S5 | 4.194 | 4.194 |
| | S6 | 3.723 | 3.723 |
| Lens 4 | S7 | 3.800 | 3.800 |
| | S8 | 3.682 | 3.682 |
| Lens 5 | S9 | 3.565 | 3.565 |
| | S10 | 3.280 | 3.280 |
| Lens 6 | S11 | 4.008 | 3.799 |
| | S12 | 4.170 | 3.799 |
| Lens 7 | S13 | 4.119 | 3.800 |
| | S14 | 4.884 | 3.800 |
| Lens 8 | S15 | 6.303 | 4.900 |
| | S16 | 6.472 | 4.900 |

TABLE 3

| | First mode (Mode 1) |
|------|---------------------|
| d_G12 (mm) | 5.424 |
| d_G23 (mm) | 4.516 |
| d_G34 (mm) | 0.634 |
| EFL_1 (mm) | 15.2 |
| EPD_1 | 4.734 |
| Magnification (First magnification) | 4.4 배 |
| F-number | 3.21 |
| FOV (degree) | 21.39 |
| TTL_1 (mm) | 21.199 |
| BFL_1 (mm) | 0.999 |
| ImgH (mm) | 2.823 |

Tables 1 to 3 relate to lens data when the optical system 1000 and the camera module including the same according to the embodiment operate in the first mode. In detail, Tables 1 and 2 show the radii of curvature on the optical axis OA of the first to eighth lenses 110 to 180, a center thickness of the lens, the center distances between lenses, the refractive indies, the Abbe numbers, and maximum/minimum clear apertures CA and CH. Table 3 shows the effective focal length (EFL_1) and entrance pupil diameter (EPD_1) for the first mode with the first magnification, the distance between the first lens group G1 and the second lens group G2 (d_G12)), the distance (d_G23) between the second lens group G2 and the third lens group G3, and the distance (d_G34) between the third lens group G3 and the fourth lens group G4. Referring to Table 1, the first lens 110 may have positive (+) refractive power on the optical axis OA of the optical system 1000 according to the embodiment. The first lens 110 may include a plastic material. On the optical axis OA, the first surface S1 of the first lens 110 may have a convex shape, and the second surface S2 may have a concave shape. The first lens 110 may have a meniscus shape that is convex toward the object on the optical axis OA. The first surface S1 may be an aspherical surface, and the second surface S2 may be an aspherical surface.

The second lens 120 may have positive (+) refractive power on the optical axis OA. The second lens 120 may include a plastic material. On the optical axis OA, the third surface S3 of the second lens 120 may have a convex shape, and the fourth surface S4 may have a concave shape. The second lens 120 may have a meniscus shape that is convex toward the object on the optical axis OA. The third surface S3 may be an aspherical surface, and the fourth surface S4 may be an aspherical surface.

The third lens 130 may have a refractive power opposite to that of the first lens 110 on the optical axis OA. In detail, the third lens 130 may have negative (−) refractive power on the optical axis OA. The third lens 130 may include a glass material. On the optical axis OA, the fifth surface S5 of the third lens 130 may have a concave shape, and the sixth surface S6 may have a concave shape. The third lens 130 may have a concave shape to both sides on the optical axis. The fifth surface S5 may be an aspherical surface, and the sixth surface S6 may be an aspherical surface. The third lens 130 may have a refractive index greater than about 1.6. The third lens 130 may have the highest refractive index among the lenses included in the first lens group G1. For example, the third lens 130 may have the highest refractive index among the plurality of lenses 100. In detail, the refractive index of the third lens 130 may be greater than 1.8.

The fourth lens 140 may have positive (+) refractive power on the optical axis OA. The fourth lens 140 may include a plastic material. On the optical axis OA, the seventh surface S7 of the fourth lens 140 may have a convex shape, and the eighth surface S8 may have a convex shape. The fourth lens 140 may have a convex shape to both sides. The seventh surface S7 may be an aspherical surface, and the eighth surface S8 may be an aspherical surface.

The fifth lens 150 may have a refractive power opposite to that of the fourth lens 140 on the optical axis OA. In detail, the fifth lens 150 may have negative refractive power on the optical axis OA. The fifth lens 150 may include a plastic material. On the optical axis OA, the ninth surface S9 of the fifth lens 150 may have a convex shape, and the tenth surface S10 may have a concave shape. The fifth lens 150 may have a meniscus shape that is convex toward the object on the optical axis OA. The ninth surface S9 may be an aspherical surface, and the tenth surface S10 may be an aspherical surface. The sixth lens 160 may have positive (+) refractive power on the optical axis OA. The sixth lens 160 may include a plastic material. On the optical axis OA, the eleventh surface S11 of the sixth lens 160 may have a concave shape, and the twelfth surface S12 may have a convex shape. The sixth lens 160 may have a meniscus shape that is convex toward the sensor on the optical axis OA. The eleventh surface S11 may be an aspherical surface, and the twelfth surface S12 may be an aspherical surface.

The seventh lens 170 may have a refractive power opposite to that of the sixth lens 160 on the optical axis OA. In detail, the seventh lens 170 may have negative refractive power on the optical axis OA. The seventh lens 170 may include a glass material. On the optical axis OA, the thirteenth surface S13 of the seventh lens 170 may have a concave shape, and the fourteenth surface S14 may have a concave shape. The seventh lens 170 may have a concave shape to both sides on the optical axis OA. The thirteenth surface S13 may be an aspherical surface, and the fourteenth surface S14 may be an aspherical surface. The eighth lens 180 may have positive (+) refractive power on the optical axis OA. The eighth lens 180 may include a plastic material. On the optical axis OA, the fifteenth surface S15 of the eighth lens 180 may have a convex shape, and the sixteenth surface S16 may have a convex shape. The eighth lens 180 may have a shape in which both sides are convex on the optical axis OA. The fifteenth surface S15 may be an aspherical surface, and the sixteenth surface S16 may be an aspherical surface.

Additionally, the aspheric coefficient values of each lens surface in the optical system 1000 according to the embodiment are shown in Table 4 below.

TABLE 5

| Lens group | Lens | Non-circular ratio (CH/CA) |
|---|---|---|
| First lens group | Lens 1 | 0.817 |
| | Lens 2 | 0.921 |
| | Lens 3 | 1.000 |
| Second lens group | Lens 4 | 1.000 |
| | Lens 5 | 1.000 |
| Third lens group | Lens 6 | 0.911 |
| | Lens 7 | 0.778 |
| Fourth lens group | Lens 8 | 0.757 |

Referring to Table 5, the non-circular ratio of the plurality of lenses 100 may be different from each other. In detail, in the first lens group G1, the first lens 110 may have the smallest non-circular ratio, and the third lens 130 may have the largest non-circular ratio. The third lens 130 is a circular lens with a circular effective region and may have a non-circular ratio of 1. The non-circular ratio of the lenses included in the first lens group G1 may have a greater non-circular ratio as the lens is adjacent to the moving group whose position changes depending on the operation mode, that is, the second lens group G2. In the second lens group G2, the non-circular ratio of the fourth lens 140 and the fifth

TABLE 4

| | Lens 1 | | Lens 2 | | Lens 3 | | Lens 4 | |
|---|---|---|---|---|---|---|---|---|
| | S1 | S2 | S3 | S4 | S1 | S2 | S3 | S4 |
| Y Radius | 4.844 | 11.634 | 6.015 | 27.687 | −29.006 | 3.884 | 3.132 | −15.567 |
| K | −8.29E−02 | −5.51E+00 | −5.50E−01 | 9.33E+01 | 6.74E+01 | −6.32E−01 | −2.28E−01 | −2.24E+01 |
| A | 7.14E−05 | −1.65E−03 | −1.16E−03 | 4.16E−03 | 3.68E−03 | 1.98E−03 | 3.15E−04 | −3.00E−03 |
| B | −6.52E−06 | 3.10E−03 | 3.78E−03 | −4.04E−03 | −8.62E−03 | −6.72E−03 | 1.08E−05 | 7.56E−03 |
| C | 7.87E−05 | −2.38E−03 | −3.52E−03 | 1.18E−03 | 7.89E−03 | 6.77E−03 | 1.11E−04 | −1.03E−02 |
| D | −4.76E−05 | 1.03E−03 | 1.65E−03 | 2.23E−04 | −3.33E−03 | −3.47E−03 | −1.08E−04 | 8.93E−03 |
| E | 1.43E−05 | −2.66E−04 | −4.35E−04 | −2.30E−04 | 8.67E−04 | 9.10E−04 | 9.85E−05 | −4.77E−03 |
| F | −2.48E−06 | 4.22E−05 | 6.61E−05 | 6.06E−05 | −1.21E−04 | −7.67E−05 | −4.98E−05 | 1.59E−03 |
| G | 2.52E−07 | −4.01E−06 | −5.61E−06 | −7.41E−06 | 6.43E−06 | −1.67E−05 | 1.45E−05 | −3.21E−04 |
| H | −1.39E−08 | 2.10E−07 | 2.31E−07 | 3.99E−07 | 3.00E−07 | 4.32E−06 | −2.25E−06 | 3.58E−05 |
| J | 3.16E−10 | −4.63E−09 | −2.90E−09 | −5.41E−09 | −3.60E−08 | −2.76E−07 | 1.49E−07 | −1.68E−06 |

| | Lens 5 | | Lens 6 | | Lens 7 | | Lens 8 | |
|---|---|---|---|---|---|---|---|---|
| | S9 | S10 | S11 | S12 | S9 | S10 | S11 | S12 |
| Y Radius | 11.182 | 4.863 | −4.582 | −2.861 | −5.150 | 3.493 | 27.497 | −6.671 |
| K | 1.41E+01 | 4.99E+00 | −8.81E+00 | −4.24E+00 | 3.75E+00 | −1.48E+01 | 2.98E+01 | −1.64E+00 |
| A | −1.13E−03 | 3.88E−03 | 4.32E−03 | −5.96E−03 | −7.481E−02 | −4.64E−02 | 1.07E−03 | −1.30E−03 |
| B | 7.26E−03 | 1.30E−03 | −2.88E−03 | −2.60E−03 | 2.94E−02 | 2.58E−02 | −3.11E−04 | 8.98E−04 |
| C | −1.12E−02 | −2.77E−03 | 3.77E−03 | 4.32E−03 | −3.27E−03 | −9.04E−03 | −1.23E−05 | −3.89E−04 |
| D | 9.97E−03 | 1.93E−03 | −2.38E−03 | −9.66E−04 | 2.42E−04 | 2.04E−03 | 9.15E−06 | 7.44E−05 |
| E | −5.46E−03 | −4.61E−04 | 7.08E−04 | −1.08E−03 | −2.28E−03 | −2.68E−04 | −3.21E−06 | −8.52E−06 |
| F | 1.85E−03 | −2.49E−04 | −4.14E−05 | 8.09E−04 | 1.72E−03 | 1.73E−05 | 8.07E−07 | 7.77E−07 |
| G | −3.78E−04 | 2.04E−04 | −2.92E−05 | −2.31E−04 | −5.35E−04 | −6.18E−07 | −1.10E−07 | −6.47E−08 |
| H | 4.22E−05 | −5.43E−05 | 7.05E−06 | 3.10E−05 | 7.88E−05 | 9.05E−08 | 7.35E−09 | 3.69E−09 |
| J | −1.95E−06 | 5.25E−06 | −4.84E−07 | −1.61E−06 | −4.51E−06 | −7.81E−09 | −1.91E−10 | −9.10E−11 |

In the optical system 1000 according to the embodiment, the plurality of lenses 100 may have a non-circular ratio as shown in Table 5 below. Here, the non-circular ratio may mean the ratio (CH/CA) of the minimum clear aperture (Clear Height, CH) and the maximum clear aperture (CA) with the large lens surface of the clear apertures (CA) between the object-side surfaces and the sensor-side surfaces of the lenses.

lens 150 may be the same. In detail, the fourth lens 140 and the fifth lens 150 may be circular lenses with a circular effective region. Accordingly, the non-circular ratio of each of the fourth lens 140 and the fifth lens 150 may be equal to 1.

In the third lens group G3, the non-circular ratio of the sixth lens 160 may be greater than the non-circular ratio of the seventh lens 170. The non-circular ratio of the lenses included in the third lens group G3 may have a greater non-circular ratio as the lens is adjacent to the moving group whose position changes depending on the operation mode, that is, the second lens group G2. Additionally, the non-circular ratio of the lenses included in the third lens group G3 may have a smaller non-circular ratio in fixed groups with fixed positions, that is, lenses adjacent to the fourth lens group G4.

Among the lenses included in the moving group G2 and G3, the fourth lens 140 and the fifth lens 150 may have the largest non-circular ratio, and the seventh lens 170 may have the smallest non-circular ratio. Among the lenses included in the fixed groups G1 and G4, the third lens 130 may have the largest non-circular ratio, and the eighth lens 180 may have the smallest non-circular ratio. At this time, the non-circular ratio of the eighth lens 180 may be the smallest among the non-circularities of the plurality of lenses 100. That is, the non-circular ratio of the non-circular lens among the plurality of lenses 100 may have a large value in the order of the second lens 120, the sixth lens 160, the first lens 110, the seventh lens 170, and the eight lens 180.

The Abbe number (vd4) of the fourth lens 140 included in the second lens group G2 may differ from the Abbe number (vd5) of the fifth lens 150 by more than 20. As the fourth lens 140 and the fifth lens 150 have the above-described Abbe number difference, the change in chromatic aberration that occurs when the magnification changes due to movement of the second lens group G2 may be minimized. The Abbe number (vd7) of the seventh lens 170 included in the third lens group G3 may differ from the Abbe number (vd6) of the sixth lens 160 by more than 20. As the sixth lens 160 and the seventh lens 170 have the above-described difference in Abbe number, a change in chromatic aberration occurring when the magnification changes according to the movement of the third lens group G3 may be minimized and/or compensated to serve as chromatic.

A camera module according to an embodiment can obtain information about a subject at various magnifications. In detail, the driving member may control the positions of the second lens group G2 and the third lens group G3, and through this, the camera module can operate at various magnifications. For example, referring to FIGS. 1 to 4 and Tables 1 to 5, the camera module including the optical system 1000 may operate in the first mode with a first magnification. The first magnification may be about 3 times to about 5 times. In detail, in an embodiment, the first magnification may be about 4.4 times. In the first mode, each of the second lens group G2 and the third lens group G3 may be located at a location defined as the first position. When the initial positions of each of the second lens group G2 and the third lens group G3 are the first position, the two lens groups G2 and G3 may not move. Alternatively, when the initial positions of each of the second lens group G2 and the third lens group G3 are different from the first position, the two lens groups G2 and G3 may be moved to the first position by the driving force of the driving member.

Accordingly, each of the first to fourth lens groups G4 may be arranged at set distances. For example, the second lens group G2 may be located at a first distance (d_G12) from the first lens group G1, and the third lens group G3 may be located at a distance (d_G34) between the fourth lens group G4, and the second lens group G1 may be located in a region spaced apart form from the third lens group G3 by the third distance (d_G23). Here, the first to third distances (d_G12, d_G34, d_G23) may mean the distances between the lens groups in the optical axis OA.

When the camera module operates in the first mode, the optical system 1000 may have a first TTL (TTL_1) defined as the TTL value and a first BFL (BFL_1) defined as the BFL value at the first position. Additionally, the optical system 1000 may have a first EFL (EFL_1) defined as a first effective focal length at the first position. Additionally, in the first mode, the field of view (FOV) of the camera module may be less than about 25 degrees, and the F-number may be less than about 3.5.

The optical system 1000 may have excellent aberration characteristics as shown in FIGS. 3 and 4 in the first mode. In detail, FIG. 3 is a graph of diffraction MTF characteristics of the optical system 1000 operating in the first mode (first magnification), and FIG. 4 is a graph of aberration characteristics.

The aberration graph in FIG. 4 is a graph measuring spherical aberration, astigmatic field curves, and distortion from left to right. In FIG. 4, the X-axis may represent focal length (mm) and distortion (%), and the Y-axis may represent the height of the image. Additionally, the graph for spherical aberration is a graph for light in the wavelength bands of about 435 nm, about 486 nm, about 546 nm, about 587 nm, and about 656 nm, and the graph for astigmatism and distortion aberration is a graph for light in the 546 nm wavelength band. In the aberration diagram of FIG. 4, it may be interpreted that the aberration correction function is better as each curve approaches the Y-axis and as shown in FIG. 4, in the optical system 1000 according to the embodiment, it may be seen that measured values are adjacent to the Y-axis in almost regions.

TABLE 6

|  | Second mode (Mode 2) |
| --- | --- |
| d_G12 (mm) | 0.300 |
| d_G23 (mm) | 3.740 |
| d_G34 (mm) | 6.534 |
| EFL_2 (mm) | 33.5 |
| EPD_2 | 5.906 |
| Magnification (Second magnification) | 9.6 |
| F-number | 5.92 |
| FOV (degree) | 9.8 |
| TTL_2 (mm) | 21.199 |
| BFL_2 (mm) | 0.999 |
| ImgH (mm) | 2.823 |

Table 6 shows the effective focal length (EFL_2) and entrance pupil diameter (EPD_2) for the second mode with the second magnification, the distance (d_G12) between the first lens group G1 and the second lens group G2, the distance (d_G23) between the second lens group G2 and the third lens group G3, and the distance (d_G34) between the third lens group G3 and the fourth lens group G4. A camera module according to an embodiment may obtain information about a subject at various magnifications. In detail, the driving member may control the positions of the second lens group G2 and the third lens group G3, and through this, the camera module may operate at various magnifications. For example, referring to FIGS. 5 to 7 and Table 1 and Table 6, the camera module including the optical system 1000 may operate in the second mode with a second magnification. The second magnification may be about 8 times to about 11 times. In detail, the second magnification may be about 9.6 times. In the second mode, each of the second lens group G2 and the third lens group G3 may be located at a location defined as the second position. When the initial positions of each of the second lens group G2 and the third lens group G3 are the second positions, the two lens groups G2 and G3 may not move. Alternatively, when the initial positions of each of the second lens group G2 and the third lens group G3 are different from the second position, the two lens groups G2 and G3 may be moved to the second position by the driving force of the driving member.

Accordingly, each of the first to fourth lens groups G1 to G4 may be arranged at set distances. For example, the second lens group G2 may be located at a first distance (d_G12) from the first lens group G1, the third lens group G3 may be located at a distance (d_G34) between the fourth lens group G4, and the second lens group G1 may be located in a region spaced apart form from the third lens group G3 by the third distance (d_G23). Here, the first to third distances (d_G12, d_G34, and d_G23) may mean the distances between the lens groups in the optical axis OA.

The first distance (d_G12) in the first mode may be greater than the first distance (d_G12) in the second mode, and the second distance (d_G34) of the first mode may be smaller than the second distance (d_G34) in the second mode. Additionally, the third distance (d_G23) of the first mode may be greater than the third distance (d_G23) in the second mode. When the camera module operates in the second mode, the optical system 1000 uses a second TTL (TTL_2) defined as the TTL value and a second BFL (BFL_2) defined as the BFL value at the second position. Additionally, the optical system 1000 may have a second EFL (EFL_2) defined as a second effective focal length at the second position. At this time, the second EFL (EFL_2) may be larger than the first EFL (EFL_1). Additionally, in the second mode, FOV of the camera module may be less than about 12 degrees, and the F-number may be less than about 6.5.

The optical system 1000 may have excellent aberration characteristics as shown in FIGS. 6 and 7 in the second mode. In detail, FIG. 6 is a graph of diffraction MTF characteristics of the optical system 1000 operating in the second mode (second magnification), and FIG. 7 is a graph of aberration characteristics. The aberration graph in FIG. 7 is a graph measuring spherical aberration, astigmatic field curves, and distortion from left to right. In FIG. 7, the X-axis may represent focal length (mm) and distortion (%), and the Y-axis may represent the height of the image. Additionally, the graph for spherical aberration is a graph for light in the wavelength bands of about 435 nm, about 486 nm, about 546 nm, about 587 nm, and about 656 nm, and the graph for astigmatism and distortion aberration is a graph for light in the 546 nm wavelength band. In the aberration diagram of FIG. 7, it may be interpreted that the aberration correction function is better as each curve approaches the Y-axis and as shown in FIG. 7, in the optical system 1000 according to the embodiment, it may be seen that measured values are adjacent to the Y-axis in almost regions.

TABLE 7

|  | Third mode (Mode 3) |
| --- | --- |
| d_G12 (mm) | 2.607 |
| d_G23 (mm) | 3.740 |
| d_G34 (mm) | 6.534 |
| EFL_3 (mm) | 24.4 |
| EPD_3 | 5.314 |
| Magnification (Third magnification) | 7 |
| F-number | 4.65 |
| FOV (degree) | 13.33 |
| TTL_3 (mm) | 21.199 |
| BFL_3 (mm) | 0.999 |
| ImgH (mm) | 2.823 |

Table 7 shows the effective focal length (EFL_3) and the entrance pupil diameter (EPD_3) for the third mode having the third magnification, the distance between the first lens group G1 and the second lens group G2, the distance between the second lens group G2 and the third lens group G3, and the distance between the third lens group G3 and the fourth lens group G4. A camera module according to an embodiment may obtain information about a subject at various magnifications. In detail, the driving member may control the positions of the second lens group G2 and the third lens group G3, and through this, the camera module may operate at various magnifications. For example, referring to FIGS. 8 to 10 and Table 1 and Table 7, the camera module including the optical system 1000 may operate in the third mode with a third magnification. The third magnification may be about 5 times to about 8 times. In detail, the third magnification may be about 7 times. In the third mode, each of the second lens group G2 and the third lens group G3 may be located at a location defined as the third position. The third position may be a region between the first and second positions. For example, the third position of the second lens group G2 may be located between the first and second positions of the second lens group G2, and the third position of the third lens group G3 may be located between the first and second positions of the second lens group G2. The position may be located between the first and second positions of the third lens group G3. When the initial positions of each of the second lens group G2 and the third lens group G3 are the third position, the two lens groups G2 and G3 may not move. Alternatively, when the initial positions of each of the second lens group G2 and the third lens group G3 are different from the third position, the two lens groups G2 and G3 may be moved to the third position by the driving force of the driving member.

Accordingly, each of the first to fourth lens groups G1 to G4 may be arranged at set distances. For example, the second lens group G2 may be located at a first distance (d_G12) from the first lens group G1, the third lens group G3 may be located at a distance (d_G34) between the fourth lens group G4, and the second lens group G1 may be located in a region spaced apart form from the third lens group G3 by the third distance (d_G23). Here, the first to third distances (d_G12, d_G34, and d_G23) may mean the distances between the lens groups in the optical axis OA. The first distance (d_G12) in the third mode may be smaller than the first distance (d_G12) in the first mode and may be larger than the first distance (d_G12) in the second mode. The second distance in the third mode may be greater than the second distance (d_G34) in the first mode and may be smaller than the second distance (d_G34) in the second mode. The third distance (d_G23) in the third mode may be smaller than the third interval (d_G23) in the first mode and the third distance (d_G23) of the second mode.

When the camera module operates in the third mode, the optical system 1000 uses a third TTL (TTL_3) defined as the TTL value and a third BFL (BFL_3) defined as the BFL value at the third position. Additionally, the optical system 1000 may have a third EFL (EFL_3) defined as a third effective focal length at the third position. At this time, the third EFL (EFL_2) may be larger than the first EFL (EFL_1) and may be smaller than the second EFL (EFL_2). Additionally, in the third mode, the FOV of the camera module may be less than about 17 degrees, and the F-number may be less than about 5.

The optical system 1000 may have excellent aberration characteristics as shown in FIGS. 9 and 10 in the second mode. In detail, FIG. 9 is a graph of diffraction MTF characteristics of the optical system 1000 operating in the third mode (third magnification), and FIG. 10 is a graph of aberration characteristics. The aberration graph in FIG. 10 is a graph measuring spherical aberration, astigmatic field curves, and distortion from left to right. In FIG. 10, the X-axis may represent focal length (mm) and distortion (%), and the Y-axis may represent the height of the image. Additionally, the graph for spherical aberration is a graph for light in the wavelength bands of about 435 nm, about 486 nm, about 546 nm, about 587 nm, and about 656 nm, and the graph for astigmatism and distortion aberration is a graph for light in the 546 nm wavelength band. In the aberration diagram of FIG. 10, it may be interpreted that the aberration correction function is better as each curve approaches the Y-axis and as shown in FIG. 10, in the optical system 1000 according to the embodiment, it may be seen that measured values are adjacent to the Y-axis in almost regions. The optical system 1000 according to the embodiment includes various modes and may provide an autofocus (AF) function for the subject by zooming the subject at a magnification corresponding to each mode.

In the optical system 1000 according to the embodiment, the first lens group G1 closest to the object may be disposed at a fixed position without moving. Accordingly, the first to third TTLs (TTL1, TTL2, and TTL3) may have the same value. Additionally, the fourth lens group G4 closest to the image sensor 300 in the optical system 1000 may be disposed at a fixed position without moving. Accordingly, the first to third BFLs (BFL1, BFL2, BFL3) may also have the same values. In the optical system 1000, lenses included in the fixed group and the moving group may have a non-circular shape. Accordingly, a space in which the second and third lens groups G2 and G3 are to be disposed between the first and fourth lens groups G1 and G4 may be structurally secured, and moving distances of the second and third lens groups G2 and G3 may be significantly reduced when the operation mode is changed. In detail, when changing the operation mode, each of the second and third lens groups G2 and G3 may move within a range of up to 6 mm or less, thereby improving power consumption characteristics. In addition, the moving distance of each mobile group is significantly reduced compared to TTL, allowing more precise control of the position of the mobile group.

TABLE 8

| | Embodiment | |
|---|---|---|
| CA_G1max | 6.000 | mm |
| CA_G2max | 3.800 | mm |
| CA_G3max | 4.884 | mm |
| CA_G4max | 6.472 | mm |
| CH_G1max | 4.902 | mm |
| CH_G2max | 3.800 | mm |
| CH_G3max | 3.8000 | mm |
| CH_G4max | 4.900 | mm |
| CA_G1min | 3.723 | mm |
| CA_G2min | 3.280 | mm |
| CA_G3min | 4.008 | mm |
| CA_G4min | 6.303 | mm |
| CH_G1min | 3.723 | mm |
| CH_G2min | 3.280 | mm |
| CH_G3min | 3.799 | mm |
| CH_G4min | 4.900 | mm |
| L_G1 | 3.843 | mm |
| L_G2 | 2.039 | mm |
| L_G3 | 2.157 | mm |
| L_G4 | 1.587 | mm |
| f_G1 | −32.329 | mm |
| f_G2 | 6.767 | mm |
| f_G3 | −7.123 | mm |
| f_G4 | 8.052 | mm |
| m_G2 | 5.124 | mm |
| m_G3 | 5.900 | mm |

TABLE 9

| | Equation | Embodiment |
|---|---|---|
| Equation 1 | $n\_G1, n\_G2, n\_G3 > 1$ | Satisfaction |
| Equation 2 | $0.7 < CH\_G1max/CA\_G1max < 1$ | 0.817 |
| Equation 3 | $0.7 < CH\_G4max/CA\_G4max < 1$ | 0.757 |
| Equation 4 | $0.7 < CH\_G3max/CA\_G3max < 1$ | Satisfaction |
| Equation 5 | $CH\_G4max/CA\_G4max < CH\_G1max/CA\_G1max$ | Satisfaction |
| Equation 6 | $0.7 < (CH\_G1max/CA\_G1max)/(CH\_G1min/CA\_G1min) < 1$ | Satisfaction |
| Equation 7 | $CH\_G2max/CA\_G2max = CH\_G2min/CA\_G2min$ | Satisfaction |
| Equation 8 | $0.9 < CH\_G1max/CH\_G4max < 1.1$ | 1.001 |
| Equation 9 | $1 < CH\_G1max/CH\_G2max < 2$ | 1.290 |
| Equation 10 | $1 < CH\_G4max/CH\_G3max < 2$ | 1.289 |
| Equation 11 | $0.9 < CH\_G2max/CH\_G3max < 1.1$ | 1.000 |
| Equation 12 | $CH\_G4max/CH\_G1max < CA\_G4max/CA\_G1max$ | Satisfaction |
| Equation 13 | $1 < L\_G1/L\_G2 < 3$ | 1.885 |
| Equation 14 | $1 < L\_G1/L\_G3 < 3$ | 1.782 |
| Equation 15 | $0.05 < L\_G1/TTL < 0.5$ | 0.181 |
| Equation 16 | $0.05 < L\_G2/TTL < 0.4$ | 0.096 |
| Equation 17 | $20 < |vd4 - vd5|$ | Satisfaction |
| Equation 18 | $20 < |vd6 - vd7|$ | Satisfaction |
| Equation 19 | $1.6 < n3d$ | Satisfaction |
| Equation 20 | $1 < L1R1/L3R2 < 2$ | 1.247 |
| Equation 21 | $1 < L1R1/L4R1 < 2$ | 1.546 |
| Equation 22 | $1 < L3R2/L4R1 < 2$ | 1.240 |
| Equation 23 | $-1.5 < L1R1/L8R2 < 0$ | −0.726 |
| Equation 24 | $0.05 < m\_G2/TTL < 0.5$ | 0.242 |
| Equation 25 | $0.05 < m\_G3/TTL < 0.5$ | 0.278 |
| Equation 26 | $1.5 < m\_G2/L\_G2 < 2.5$ | 2.513 |
| Equation 27 | $2 < m\_G3/L\_G3 < 3.5$ | 2.736 |
| Equation 28 | $4 < d\_G12\_mode1/d\_G34\_mode1 < 12$ | 8.550 |
| Equation 29 | $0.01 < d\_G12\_mode2/d\_G34\_mode2 < 0.5$ | 0.046 |
| Equation 30 | $0.1 < EFL\_1/EFL\_2 < 1$ | 0.454 |
| Equation 31 | $2 < EFL\_1/EPD\_1 < 3$ | 3.211 |
| Equation 32 | $4.5 < EFL\_2/EPD\_2 < 6$ | 5.672 |
| Equation 33 | $F\#\_Mode1 < 3.5$ $F\#\_Mode2 < 6.0$ | Satisfaction |
| Equation 34 | $1 < TTL/EFL\_1 < 3$ | 1.395 |
| Equation 35 | $0.1 < TTL/EFL\_2 < 1$ | 0.633 |
| Equation 36 | $1 < CA\_Smax/ImgH < 4$ | 2.126 |
| Equation 37 | $5 < TTL/ImgH < 10$ | 7.511 |
| Equation 38 | $15 < TTL/BFL < 30$ | 21.228 |
| Equation 39 | $2 < ImgH/BFL < 4$ | 2.826 |

Table 8 relates to the items of the above-described equations in the optical system and camera module according to the embodiment, and relates to the focal length of each of the plurality of lenses 100 and the total length and the focal length of the plurality of lens groups G1, G2, G3, and G4, and moving distance of the second and third lens groups G2 and G3. Referring to Table 8, when the second and third lens groups G2 and G3 move from the first position to the second position, or from the second position to the first position, the moving distance of the third lens group G3 may be greater than that of the second lens group G2. Additionally, Table 9 shows the result values for Equations 1 to 39 of the optical system 1000 and the camera module according to the embodiment. Referring to Table 9, it may be seen that the optical system 1000 and the camera module according to the embodiment satisfy at least one of Equations 1 to 39. In detail, it may be seen that the camera module according to the embodiment satisfies all of Equations 1 to 39 above. Accordingly, the embodiment has various magnifications by moving at least one lens group, and when providing various magnifications, and an optical system with excellent characteristics may be provided. In detail, the embodiment may have a plurality of lenses 100 having a set number of lenses, a lens group having a set refractive power, a set shape and focal length, a non-circular shape, etc. Additionally, the embodiment may provide an autofocus (AF) function for the subject at various magnifications by controlling the moving distance of the moving lens group. Accordingly, the embodiment may photograph a subject at various magnifications using a single camera module and inhibit optical performance from being deteriorated at each magnification.

Referring to FIGS. 3, 4, 6, 7, 9, and 10, it may be seen that the optical system 1000 according to the embodiment has little or no change in optical characteristics even when the operation mode changes. In detail, it may be seen that even when the magnification is changed within the first to second magnification ranges by a change in the positions of the second and third lens groups G2 and G3, there is little or no change in MTF characteristics and aberration characteristics. That is, it may be seen that the optical system 1000 according to an embodiment maintains excellent optical characteristics even when the magnification is changed within the first to second magnification ranges. The embodiment may control the effective focal length by moving only some of a plurality of lens groups, and may minimize the moving distance of the moving lens group. In an embodiment, the moving lens group may have a moving distance of 6 mm or less. Specifically, when the second and third lens groups G2 and G3 move from the first position to the second position or from the second position to the first position, the moving distance of each of the second and third lens groups G2 and G3 may be 6 mm or less. Accordingly, the optical system 1000 according to an embodiment may significantly reduce the moving distance of the lens group when the magnification is changed, and may minimize power consumption required when the lens group is moved.

The optical system 1000 according to the embodiment may minimize the diffraction effect caused by a non-circular lens, and each of the plurality of lens groups may correct aberration characteristics or mutually complement aberration characteristics that change due to movement. Accordingly, the optical system 1000 according to the embodiment may minimize or inhibit changes in chromatic aberration that occur when magnification changes. In an embodiment, the magnification may be adjusted by moving a lens group other than the first lens group adjacent to the subject among a plurality of lens groups. Accordingly, the optical system 1000 may have a constant TTL value even when the lens group moves according to a change in magnification. Accordingly, the optical system 1000 and the camera module including it may be provided in a slimmer structure.

Figure 11:
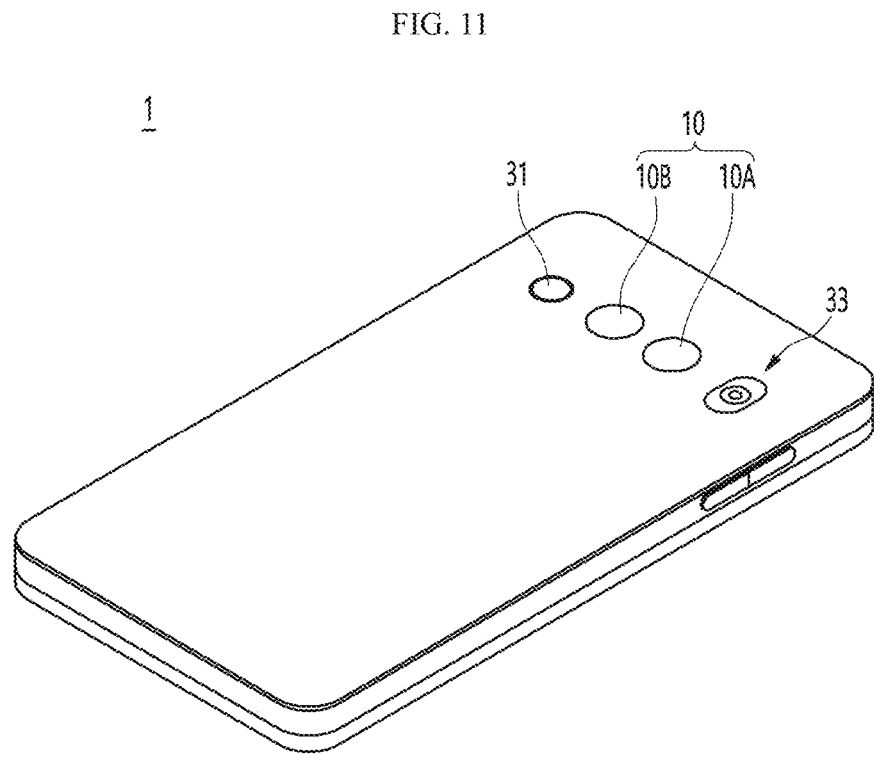

FIG. 11 is a diagram showing a camera module according to an embodiment applied to a mobile terminal.

Referring to FIG. 11, the mobile terminal 1 may include a camera module 10 provided on the rear side. The camera module 10 may include an image capturing function. Additionally, the camera module 10 may include at least one of an auto focus, zoom function, and OIS function. The camera module 10 can process image frames of still images or videos obtained by the image sensor 300 in shooting mode or video call mode. The processed image frame may be displayed on a display unit (not shown) of the mobile terminal 1 and may be stored in a memory (not shown). In addition, although not shown in the drawing, the camera module may be further disposed on the front of the mobile terminal 1.

For example, the camera module 10 may include a first camera module 10A and a second camera module 10B. At this time, at least one of the first camera module 10A and the second camera module 10B may include the above-described optical system 1000 and a driving member that controls positions of at least one lens group included in the optical system 1000, for example, the second and third lens groups G2 and G3. Accordingly, the camera module 10 may have a slim structure, and may photograph a subject at various magnifications.

The mobile terminal 1 may further include an autofocus device 31. The auto focus device 31 may include an auto focus function using a laser. The auto focus device 31 may be mainly used in a condition in which the auto focus function using the image of the camera module 10 is deteriorated, for example, in proximity of 10 m or less or in a dark environment. The autofocus device 31 may include a light emitting unit including a vertical cavity surface emitting laser (VCSEL) semiconductor device and a light receiving unit that converts light energy such as a photodiode into electrical energy.

The mobile terminal 1 may further include a flash module 33. The flash module 33 may include a light emitting device emitting light therein. The flash module 33 may emit light in a visible light wavelength band. For example, the flash module 33 may emit white light or light having a color similar to white light. However, the embodiment is not limited thereto, and the flash module 33 may emit light of various colors. The flash module 33 may be operated by a camera operation of a mobile terminal or by a user's control.

The Features, structures, effects, etc. described in the above embodiments are included in at least one embodiment of the invention, and are not necessarily limited to only one embodiment. Furthermore, features, structures, effects, etc. illustrated in each embodiment can be combined or modified for other embodiments by those of ordinary skill in the art to which the embodiments belong. Accordingly, the contents related to such combinations and modifications should be interpreted as being included in the scope of the invention. In the above, the embodiment has been mainly described, but this is only an example and does not limit the invention, and those of ordinary skill in the art to which the invention pertains are not exemplified above in the range that does not depart from the essential characteristics of the present embodiment. It will be appreciated that various modifications and applications are possible. For example, each component specifically shown in the embodiment can be implemented by modification. And the differences related to these modifications and applications should be construed as being included in the scope of the invention defined in the appended claims.

The invention claimed is:

1. An optical system comprising:
first to fourth lens groups disposed along an optical axis from an object side toward a sensor side and each including at least one lens,
wherein the first lens group has a refractive power opposite to that of the fourth lens group,
wherein the second lens group has a refractive power opposite to that of the third lens group,
wherein the first and fourth lens groups are fixed, and the second and third lens groups are movable in a direction of the optical axis,
wherein each of the first and fourth lens groups includes at least one lens of a non-circular shape,
wherein the non-circular lens has a non-circular ratio (CH/CA) greater than 0.7,
wherein the non-circular ratio is a ratio of a minimum clear aperture (CH: clear height) and a maximum clear aperture (CA) of a lens surface with a large clear aperture among an object-side surface and a sensor-side surface of the non-circular lens, and wherein a non-circular ratio of at least one lens included in the first lens group is greater than a non-circular ratio of at least one lens included in the fourth lens group.

2. The optical system of claim 1, wherein the first lens group includes first to third lenses sequentially arranged along the optical axis from the object side toward the sensor side, wherein the second lens group includes fourth and fifth lenses sequentially arranged along the optical axis from the object side toward the sensor side, wherein the third lens group includes sixth and seventh lenses sequentially arranged along the optical axis from the object side toward the sensor side, and wherein the fourth lens group includes an eighth lens.

3. The optical system of claim 2, wherein the fourth and fifth lenses are circular lenses with a non-circular ratio of 1.

4. The optical system of claim 2, wherein the first and second lenses are non-circular lenses, wherein a non-circular ratio of the first lens is smaller than a non-circular ratio of the second lens.

5. The optical system of claim 4, wherein the third lens is a circular lens with a non-circular ratio of 1.

6. The optical system of claim 2, wherein the third lens group includes at least one non-circular shape lens.

7. The optical system of claim 6, wherein the sixth and seventh lenses are non-circular lenses, wherein a non-circular ratio of the sixth lens is greater than a non-circular ratio of the seventh lens.

8. The optical system of claim 2, wherein the first lens has positive refractive power, wherein an object-side surface of the first lens has a convex shape.

9. An optical system comprising:

first to fourth lens groups disposed along an optical axis from an object side toward a sensor side and each including at least one lens, wherein the first lens group has a refractive power opposite to that of the fourth lens group, wherein the second lens group has a refractive power opposite to that of the third lens group, wherein the first and fourth lens groups are fixed and the second and third lens groups are movable in a direction of the optical axis, wherein each of the first and fourth lens groups includes at least one lens of a non-circular shape, wherein a non-circular ratio of at least one lens included in the second lens group is greater than a non-circular ratio of the non-circular lenses included in each of the first and fourth lens groups, wherein a non-circular ratio of at least one lens included in the first lens group is greater than a non-circular ratio of at least one lens included in the fourth lens group, wherein the non-circular ratio is a ratio of a minimum clear aperture (CH: clear height) and a maximum clear aperture (CA) of a lens surface with a large clear aperture among an object-side surface and a sensor-side surface of the non-circular lens, wherein when the second and third lens groups are located in a first position, the optical system has a first magnification, and when they are located in a second position different from the first position, the optical system has a second magnification, and wherein the second magnification is greater than the first magnification.

10. The optical system of claim 9, wherein when the second and third lens groups are located in the first position, the optical system has a first effective focal length, and when they are located in the second position, the optical system has a second effective focal length greater than the first effective focal length.

11. The optical system of claim 10, wherein m_G2 is a moving distance when the second lens group moves from the first position to the second position, or from the second position to the first position, wherein TTL (Total track length) is a distance along the optical axis from an object-side surface of a lens closest to the object in the first lens group to an image surface of a sensor, and wherein the following equation satisfies: $0.05 < m\_G2/TTL < 0.5$.

12. The optical system of claim 10, wherein m_G3 is a moving distance when the third lens group moves from the first position to the second position, or from the second position to the first position, wherein TTL (Total track length) is a distance along the optical axis from an object-side surface of a lens closest to the object in the first lens group to an image surface of a sensor, and wherein the following equation satisfies: $0.05 < m\_G3/TTL < 0.5$.

13. The optical system of claim 10, wherein when the second and third lens groups move from the first position to the second position, or from the second position to the first position, a moving distance of the third lens group is greater than a moving distance of the second lens group.

14. The optical system of claim 13, wherein when the second and third lens groups move from the first position to the second position, or from the second position to the first position, the moving distance of each of the second and third lens groups is 6 mm or less.

15. A camera module comprising:

an optical system and a driving member, wherein the optical system includes an optical system according to claim 1, wherein the driving member controls positions of the second and third lens groups.

16. The optical system of claim 1, wherein a number of lenses of each of the first and second lens groups is two or more, wherein the number of lenses of the first lens group is greater than the number of lenses in the second lens group, and wherein an object-side surface and a sensor-side surface of each of the lenses of the first lens group and an object-side surface and a sensor-side surface of each of the lenses of the second lens group are disposed along the optical axis.

17. The optical system of claim 1, wherein first and second lenses closest to the object among the lenses of the first lens group have a meniscus shape convex toward the object.

18. The optical system of claim 1, wherein a number of lenses of the third lens group is greater than a number of lenses of the fourth lens group,

wherein a number of lenses of the second lens group is greater than the number of lenses of the fourth lens group, wherein a number of lenses of the first lens group is greater than the number of lenses of the third lens group.

19. The optical system of claim 9, wherein a number of lenses of the first lens group is greater than a number of lenses in the second lens group, and wherein an object-side surface and a sensor-side surface of each of the lenses of the first lens group and an object-side surface and a sensor-side surface of each of the lenses of the second lens group are disposed along the optical axis.

20. The optical system of claim 1, wherein a number of lenses of the third lens group is greater than a number of lenses of the fourth lens group, wherein a number of lenses of the second lens group is greater than the number of lenses of the fourth lens group, wherein first and second lenses closest to the object among the lenses of the first lens group have a meniscus shape convex toward the object, and wherein a lens of the fourth lens group has a shape in which both sides are convex on the optical axis.

* * * * *